United States Patent
Pmsvvsv et al.

(10) Patent No.: US 11,689,049 B2
(45) Date of Patent: Jun. 27, 2023

(54) DC TRANSFER SWITCH FOR FUEL CELL SYSTEMS WITH AUXILIARY STORAGE MODULE

(71) Applicant: BLOOM ENERGY CORPORATION, San Jose, CA (US)

(72) Inventors: Prasad Pmsvvsv, Sunnyvale, CA (US); Vignan Reddy Bommireddy, San Jose, CA (US); Mehdi Ebad, San Jose, CA (US); Beau Baker, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/321,116

(22) Filed: May 14, 2021

(65) Prior Publication Data
US 2021/0359540 A1 Nov. 18, 2021

Related U.S. Application Data

(60) Provisional application No. 63/025,315, filed on May 15, 2020.

(51) Int. Cl.
*H02J 9/06* (2006.01)
*H02J 1/10* (2006.01)
*H01M 8/02* (2016.01)

(52) U.S. Cl.
CPC ............ *H02J 9/068* (2020.01); *H01M 8/02* (2013.01); *H02J 1/10* (2013.01); *H02J 9/061* (2013.01)

(58) Field of Classification Search
CPC .... H02J 9/068; H02J 1/10; H02J 9/061; H02J 9/06; H02J 9/04; H02J 2300/30; H02J 7/34; H02J 7/35
See application file for complete search history.

(56) References Cited

U.S. PATENT DOCUMENTS

| | | | |
|---|---|---|---|
| 9,225,202 B1* | 12/2015 | Kim ........................ | H02J 9/08 |
| 2005/0154499 A1* | 7/2005 | Aldridge .................. | H02J 3/38 700/286 |
| 2009/0115252 A1* | 5/2009 | Caraghiorghiopol ..... | H02J 1/10 307/48 |

(Continued)

OTHER PUBLICATIONS

U.S. Appl. No. 17/098,797, filed Nov. 16, 2020, Bloom Energy Corporation.

(Continued)

*Primary Examiner* — Rexford N Barnie
*Assistant Examiner* — Rasem Mourad
(74) *Attorney, Agent, or Firm* — The Marbury Law Group PLLC

(57) ABSTRACT

A power generation method includes providing power from a first DC power source to a load, while a second DC power source is electrically disconnected from the load, electrically connecting the second DC power source to the load and providing power from the second DC power source to the load if an output voltage from the first DC power source drops below a threshold voltage and an output voltage from the second DC power source is not below the threshold voltage, and electrically disconnecting the first DC power source from the load if an output current of the first DC power source is below a threshold current.

18 Claims, 17 Drawing Sheets

(56) References Cited

U.S. PATENT DOCUMENTS

| | | | |
|---|---|---|---|
| 2010/0013313 A1* | 1/2010 | Groff | H02J 9/061 |
| | | | 307/66 |
| 2010/0066431 A1* | 3/2010 | Carter | H02J 9/061 |
| | | | 327/408 |
| 2015/0121113 A1* | 4/2015 | Ramamurthy | H02J 7/00712 |
| | | | 713/340 |
| 2015/0288220 A1 | 10/2015 | Gurunathan et al. | |
| 2017/0005480 A1 | 1/2017 | Ballantine et al. | |
| 2017/0338502 A1 | 11/2017 | Pmsvvsv et al. | |
| 2019/0229535 A1 | 7/2019 | Pmsvvsv et al. | |
| 2019/0245216 A1 | 8/2019 | Liao et al. | |
| 2019/0312432 A1 | 10/2019 | Gurunathan et al. | |
| 2019/0312441 A1 | 10/2019 | Ballantine et al. | |
| 2020/0020964 A1 | 1/2020 | Pmsvvsv et al. | |
| 2020/0076200 A1 | 3/2020 | Ballantine et al. | |
| 2020/0212459 A1 | 7/2020 | Ballantine et al. | |
| 2020/0266658 A1 | 8/2020 | Cottuli et al. | |
| 2021/0234397 A1* | 7/2021 | Das | G01R 19/2513 |

OTHER PUBLICATIONS

U.S. Appl. No. 17/176,894, filed Feb. 16, 2021, Bloom Energy Corporation.
U.S. Appl. No. 17/317,759, filed May 11, 2021, Bloom Energy Corporation.

\* cited by examiner

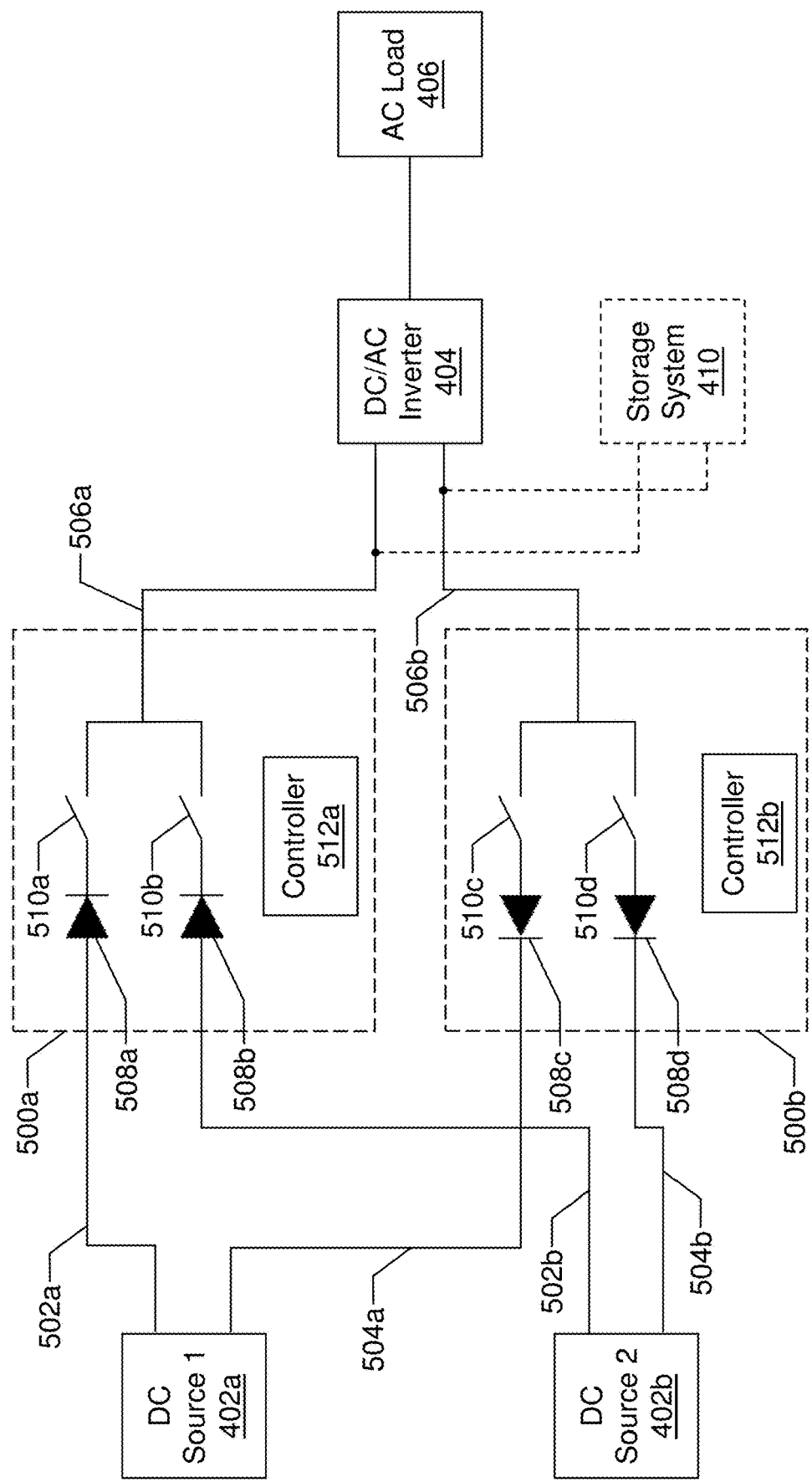

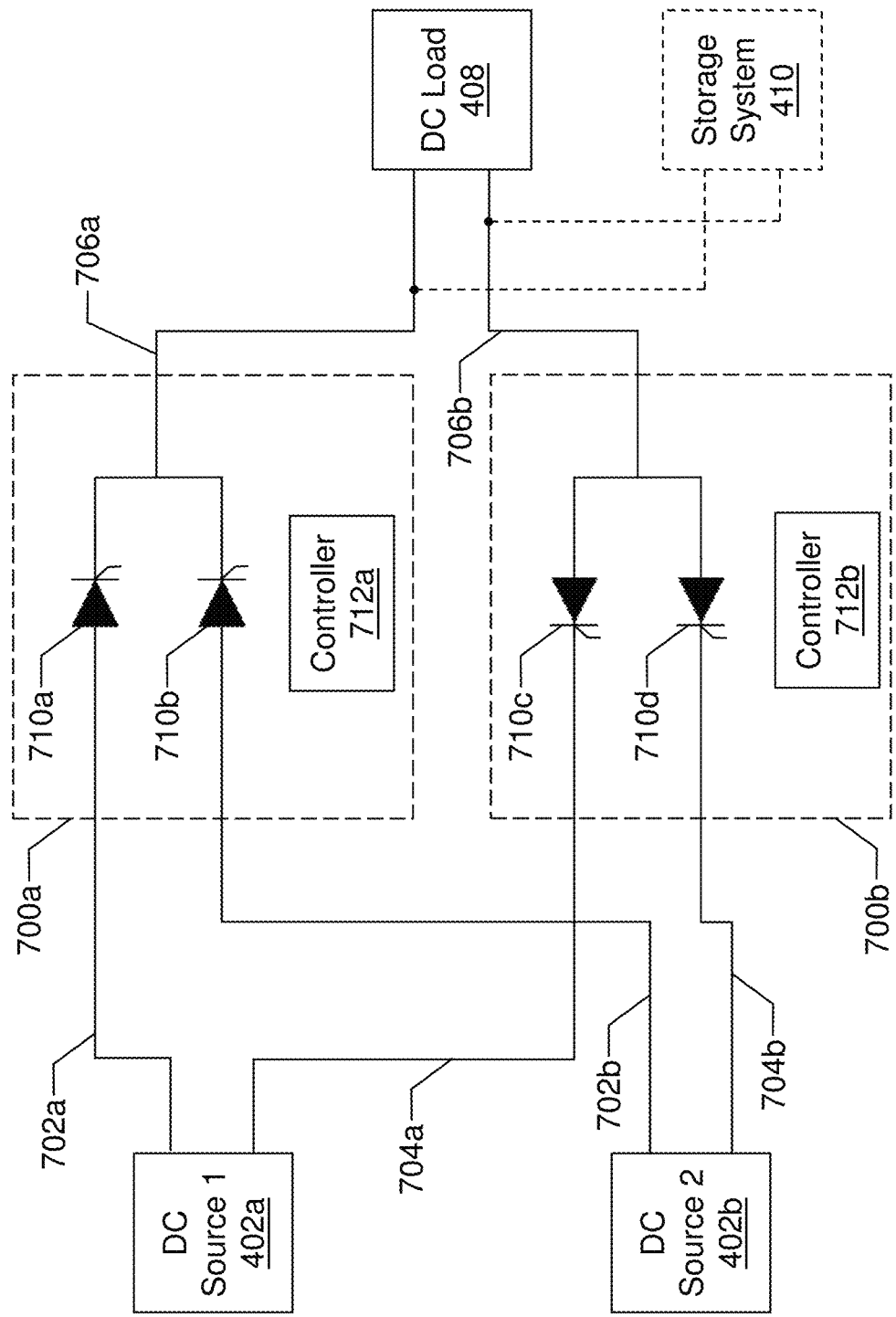

DC TRANSFER SWITCH FOR FUEL CELL SYSTEMS WITH AUXILIARY STORAGE MODULE

FIELD

The present disclosure is directed to direct current (DC) power sources, such as fuel cell systems with a DC transfer switch and an auxiliary storage module.

BACKGROUND

Certain critical loads require 2N redundant DC power sources to achieve greater availability. These loads can be either DC power loads or alternating current (AC) power loads. In most cases, these loads cannot tolerate non-zero transfer time. Switching the loads between two sources within this short duration involves complex design, especially when sources cannot be paralleled even for a short period of time.

DRAWINGS

FIGS. 5A-5C are block circuit diagrams of a DC transfer unit(s) having electromechanical electric connection devices for connecting sources and a load(s) via a split bus suitable for implementing various embodiments.

FIGS. 7A-7C are block circuit diagrams of a DC transfer unit(s) having solid state electric connection devices for connecting sources and a load(s) via a split bus suitable for implementing various embodiments.

SUMMARY

Figure 1:
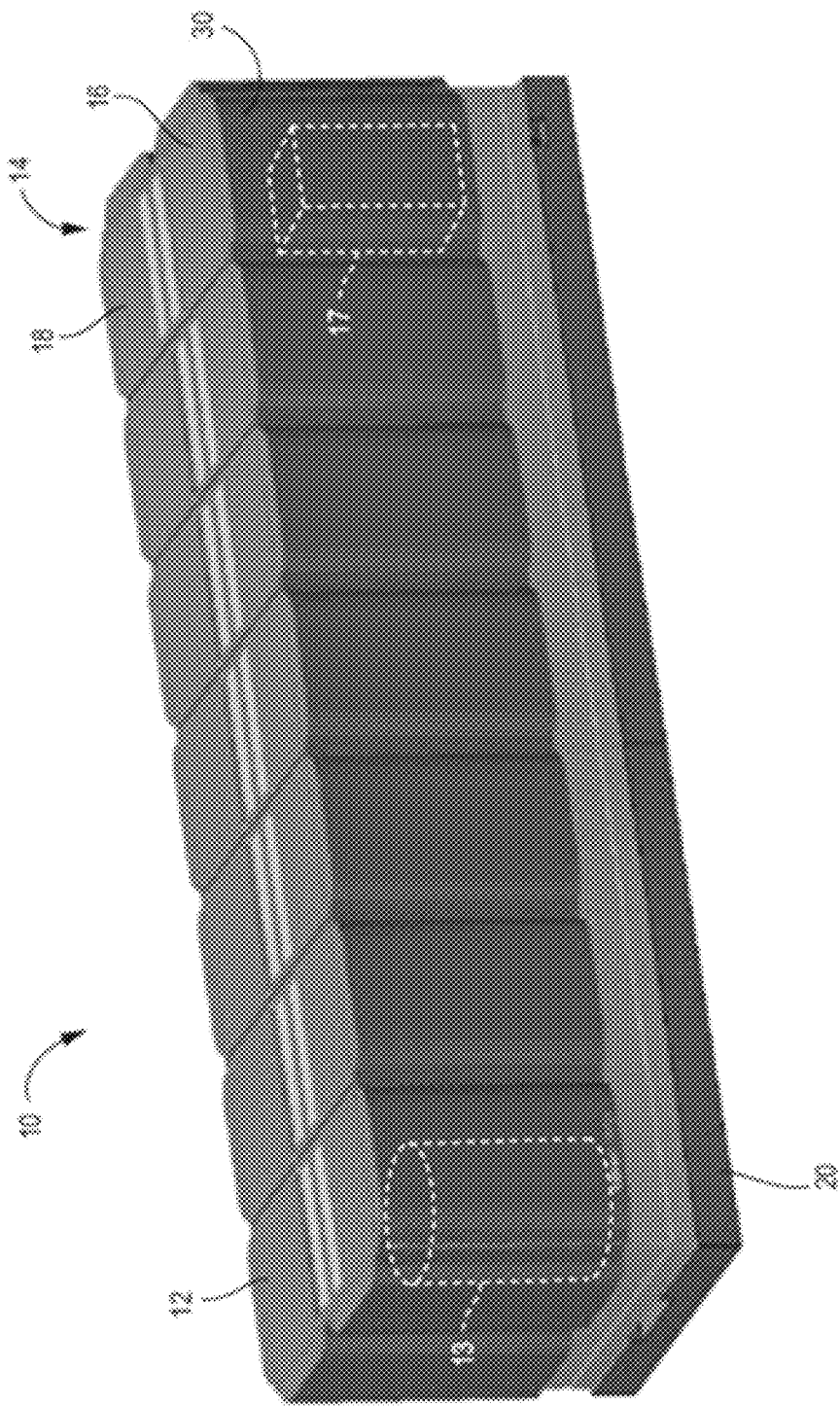
FIG. 1 is a perspective view of a fuel cell system according to various embodiments suitable for implementing various embodiments.

According to an embodiment, a power generation method includes providing power from a first DC power source to a load, while a second DC power source is electrically disconnected from the load, electrically connecting the second DC power source to the load and providing power from the second DC power source to the load if an output voltage from the first DC power source drops below a threshold voltage and an output voltage from the second DC power source is not below the threshold voltage, and electrically disconnecting the first DC power source from the load if an output current of the first DC power source is below a threshold current.

In one embodiment, both the first and the second DC power sources are electrically connected to the load for a period of time between electrically connecting the second DC power source to the load and electrically disconnecting the first DC power source from the load; and the load is transferred to receive power from the second DC power source after the step of electrically connecting the second DC power source to the load while both the first and the second DC power sources are electrically connected to the load. In one embodiment, the first DC power source fails to meet a load power demand of the load when the output voltage from the first DC power source drops below the threshold voltage.

In one embodiment, the method may further comprises activating a storage system to provide power to the load to meet the load power demand if the output voltage from the first DC power source drops below the threshold voltage. The step of activating the storage system may occur when the output voltage from the first DC power source drops to a base voltage which is less than the threshold voltage; and the storage system may provide power to the load through a load bus such that a voltage on the load bus equals to the base voltage. A combination of the first DC power source and the storage system may provide power to the load to meet the load power demand.

In one embodiment, the method further comprises deactivating the storage system to stop providing power to the load if the output voltage from the second DC power source remains above the threshold voltage after electrically connecting the second DC power source to the load, wherein the voltage on the load bus is at least equal to the threshold voltage after deactivating the storage system. Alternatively, if the output voltage from the second DC power source drops below the threshold voltage after electrically connecting the second DC power source to the load, then continuing providing power to the load from the storage system until the output voltage from the second DC power source again reaches the threshold voltage.

In one embodiment, the first and the second DC power sources comprise fuel cell power generators. In one embodiment, electrically disconnecting the first DC power source from the load comprises turning off a first solid state connection device or a combination of a first electromechanical connection device electrically connected in series with a first diode; and electrically connecting the second DC power source to the load comprises turning on a second solid state connection device or a combination of a second electromechanical connection device electrically connected in series with a second diode.

In another embodiment, a power generation system comprises a first DC power source electrically connected to first DC transfer switch, a second DC source electrically connected to a second DC transfer switch, and a controller configured to: turn on the first transfer switch to provide power from the first DC power source to a load, while the second transfer switch is turned off such that the second DC power source is electrically disconnected from the load; turn on the second transfer switch to electrically connect the second DC power source to the load and provide power from the second DC power source to the load if an output voltage from the first DC power source drops below a threshold voltage and an output voltage from the second DC power source is not below the threshold voltage; and turn off the first transfer switch to electrically disconnect the first DC power source from the load if an output current of the first DC power source is below a threshold current. In some embodiments, the system may perform the method steps described above.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the terms "DC power source" and "DC power supply" are used interchangeably to refer to a generator capable of generating electric power from any source, such as a fuel cell, a combustion generator, a photovoltaic cell, a concentrated solar system, a wind turbine, a geothermal turbine, a hydroelectric turbine, a gas turbine, a power plant (e.g., electric grid), an alternator, an induction generator, etc. Examples herein described in terms of fuel cells do not limit the scope of the claims and descriptions to such types of DC power sources. In some embodiments, a DC power source may be an AC power generator in combination with an AC/DC rectifier which converts the AC power to DC power.

As used herein, the term "storage system" and "energy storage system" are used interchangeably to refer to any form of energy storage that may be converted to electric power, such as electrical storage, mechanical storage, electromechanical storage, electrochemical storage, thermal storage, etc. Examples may include a battery, a capacitor, a supercapacitor, a flywheel, a liquid reservoir, a gas reservoir, etc. In some embodiments, the energy storage system may include any combination of components configured to control electric energy output of the energy storage system, such as an electric connection device and/or an electric energy conditioning device, in response to a signal from a controller and/or an electric energy bus.

As used herein, the terms "electric energy" and "electric energy output" are referred to amounts of electric voltage, current, or power. Examples herein described in terms of voltage do not limit the scope of the claims and descriptions to such types of electric energy and electric energy output.

FIG. 1 illustrates an example of one electrical power generator which comprises modular fuel cell system that is more fully described in U.S. Pat. No. 8,440,362, incorporated herein by reference for descriptions of the modular fuel cell system. The modular system may contain modules and components described above as well as in U.S. Pat. No. 9,190,693, which is incorporated herein by reference for descriptions of the modular fuel cell system. The modular design of the fuel cell system enclosure 10 provides flexible system installation and operation.

The modular fuel cell system enclosure 10 includes a plurality of power module housings 12 (containing a fuel cell power module components), one or more fuel input (i.e., fuel processing) module housings 16, and one or more power conditioning (i.e., electrical output) module housings 18. For example, the system enclosure may include any desired number of modules, such as 2-30 power modules, for example 6-12 power modules. FIG. 1 illustrates a system enclosure 10 containing six power modules (one row of six modules stacked side to side), one fuel processing module, and one power conditioning module, on a common base 20. Each module may comprise its own cabinet or housing. Alternatively, the power conditioning and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power, electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in an example embodiment in FIG. 1, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may include more than one row of modules 12. For example, as noted above, the system may include two rows of power modules stacked back to back.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door 30 to module 14 may be on the side rather than on the front of the cabinet.

Figure 2:
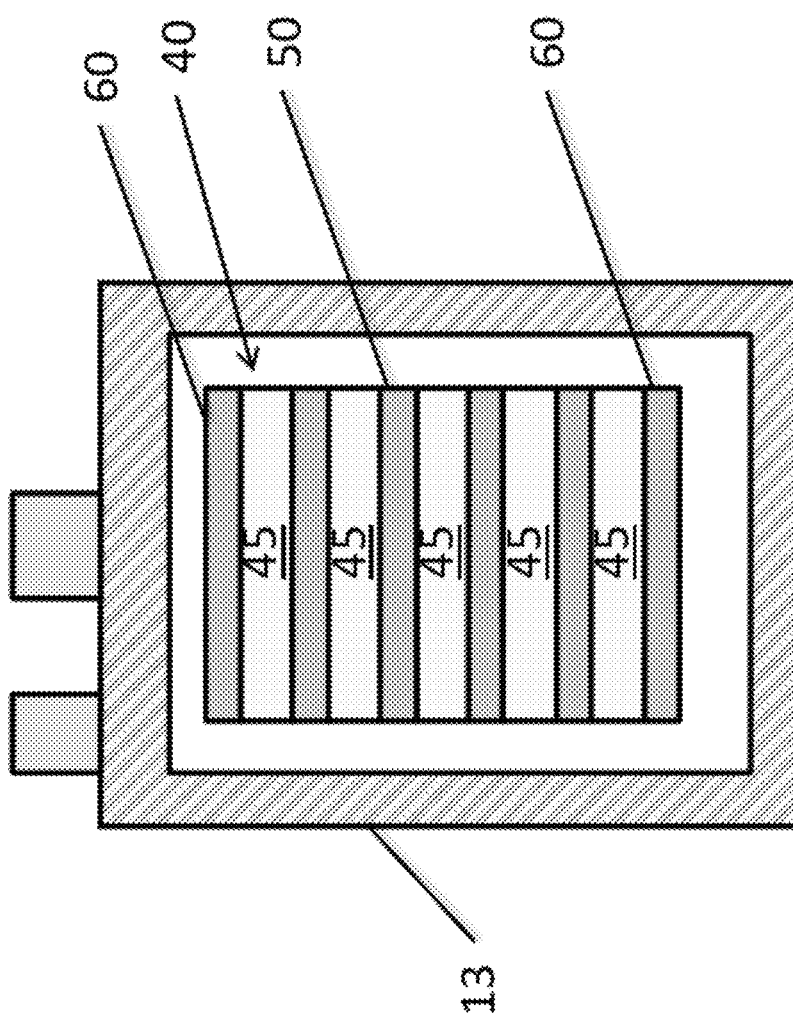
FIG. 2 is a schematic side cross-sectional view of a hot box according to various embodiments suitable for implementing various embodiments.

FIG. 2 illustrates a plan view of a fuel cell system hotbox 13 including a fuel cell stack or column 40. The hotbox 13 is shown to include the fuel cell stack or column 40. However, the hotbox 13 may include two or more of the stacks or columns 40. The stack or column 40 may include the electrically connected fuel cells 45 stacked on one another, with the interconnects 50 disposed between the fuel cells 45. The first and last fuel cells 45 in the stack or column are disposed between a respective end plate 60 and interconnect 50. The end plates 60 are electrically connected to electrical outputs of the fuel cell stack or column 40. The hotbox 13 may include other components, such as fuel conduits, air conduits, seals, electrical contacts, etc., and may be incorporated into a fuel cell system including balance of plant components. The fuel cells 45 may be solid oxide fuel cells containing a ceramic electrolyte, such as yttria stabilized zirconia (YSZ) or scandia stabilized zirconia (SSZ), an anode electrode, such as a nickel-YSZ, a Ni—SSZ or a nickel-samaria doped ceria (SDC) cermet, and a cathode electrode, such as lanthanum strontium manganite (LSM)). The interconnects 50 and/or end plates 60 may comprise any suitable gas impermeable and electrically conductive material, such as a chromium-iron alloy, such as an alloy containing 4 to 6 wt % iron and balance chromium. The interconnects 50 electrically connect adjacent fuel cells 45 and provide channels for fuel and air to reach the fuel cells 45.

Fuel cell systems, such as modular fuel cell system enclosure 10, may include and/or be augmented by various pieces of support equipment. Support equipment may include various auxiliary equipment and systems to support the operation of the fuel cell system. Support equipment may vary based on constraints and/or features at a site where the fuel cell system is installed. As non-limiting examples, support equipment may include, fuel support equipment, air support equipment, and/or ventilation support equipment. One type of fuel support equipment may include equipment configured to control supply and/or exhaust fuel pressure in the fuel cell system, such as a fuel blower or pump to supply fuel to, recycle fuel/exhaust in, and/or exhaust fuel from the fuel cell system. Another type of fuel support equipment may be configured to process fuel for the fuel cell system, such as a fuel pre-heater, exhaust scrubber, etc. Other types of fuel support equipment may also be used. One type of air support equipment may be air supply equipment configured to provide air into the fuel cell system and/or exhaust air from the fuel cell system, such as blowers or fans to provide air to and/or exhaust air from a fuel cell cathode, an anode tail gas oxidizer (ATO), an air heat exchanger, a CPOx reactor, etc. Other types of air support equipment may also be used. One type of ventilation support equipment may include equipment configured to ventilate from and/or circulate air in portions of housings external of the hot box (e.g., portions within modular fuel cell system enclosure 10 but external of the hot box 13 itself), such as a ventilation fan to blow air from within the enclosure 10 out of the enclosure 10 to maintain an acceptable enclosure 10 pressure. Other types of ventilation support equipment may also be used.

Various embodiments include electrical circuits, electrical components, and methods for transferring a load between DC power sources when a load carrying DC power source has failed or capacity of the load carrying DC power source falls to less than the load demand. A DC transfer unit may be configured to transfer a load between DC power sources by electrically connecting a disconnected DC power source to the load and electrically disconnecting an insufficient DC power source from the load. A connected DC power source may become insufficient when the DC power source is failed or capacity of the connected DC power source falls to less than the load demand. An energy storage system may be controlled to provide stored electric energy to the load to supplement the electric energy provided by the DC power sources while the DC transfer unit is transferring the load between the DC power sources. A DC transfer unit may include any combination of electric connection devices configured to connect and disconnect the DC power sources from the load. In some embodiments, the electric connection devices may be electromechanical. In some embodiments, the electric connection devices may be solid state.

Critical loads can require redundant DC power supplies to remain operational when the electric energy supply from a load carrying DC power supply becomes insufficient. In most cases, these critical loads cannot tolerate non-zero transfer time. Circuity for switching the critical loads between DC power supplies within non-zero transfer times involves complex and expensive design, especially when DC power supplies cannot be paralleled even for short period of time.

Devices for switching DC power supplies for the critical loads when the electric energy supply from the load carrying DC power supply becomes insufficient may include using electric power conditioning components, such as DC/DC converters, used to combine paralleled DC power supply outputs are costly, have a high space footprint, and are complex to design. Other devices for switching DC power supplies for the critical loads when the electric energy supply from the load carrying DC power supply becomes insufficient may include diodes performing ORing of DC power supplies, which may not work sufficiently well for fuel cell systems or any other systems with wide regulation or in systems where a DC bus is not tightly regulated. In diode ORing implementations, the critical load will be automatically switched between DC power supplies due to even disturbances in the electric energy supply that don't require switching, which in turn can lead to instability of the system. Moreover, load switching between DC power supplies itself can initiate voltage disturbances, which in turn lead to transfer of load away from the load carrying DC power supply.

Figure 3:
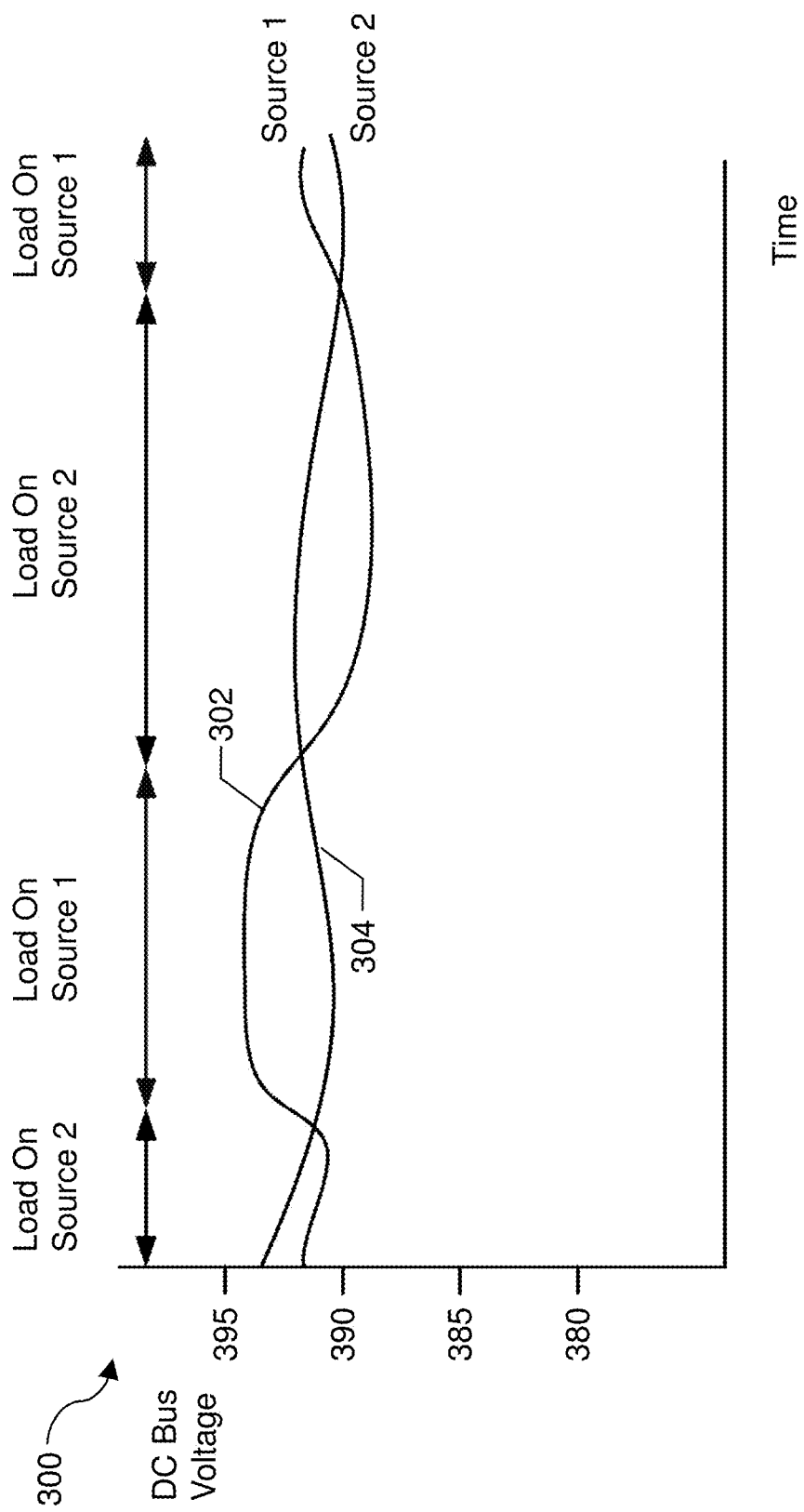
FIG. 3 is a plot of voltage over time during conventional load switching.

FIG. 3 shows the above described load switching between two DC power sources due to DC bus variations in a diode OR configuration. For example, a DC bus voltage to time plot 300 shows that each time the greater one of the DC bus voltage output from a first DC power source 302 and a DC bus voltage output from a second DC power source 302 changes, so too does which of the DC power sources becomes the load carrying DC power source. The load automatically, repeatedly switches to the DC power source with greater DC bus voltage 302, 304.

Embodiments described herein provide advantages for switching DC power supplies for the critical loads when the electric energy supply from the load carrying DC power supply becomes insufficient by providing solutions to the foregoing disadvantages. The embodiments described herein may include at least one DC transfer unit having electric connection devices, each electrically connectable to at least one DC power source and to at least one load, and at least one controller configured to control the electric connection devices. The DC transfer unit may be interchangeably referred to as a DC transfer switch. The controller may be configured to control the electric connection devices to electrically connect a disconnected second DC power source to a load in response to electric energy supply from a connected first DC power source becoming insufficient.

In some embodiments, the controller may be configured to control an energy storage system to supplement the electric energy output from the first DC power source while the DC transfer unit implements connecting the second DC power source to the load. In some embodiments, the controller may be configured to control the electric connection devices to electrically disconnect the first DC power source from the load following the second DC power source being electrically connected to the load. In some embodiments, the controller may be configured to account for expected drops in the electric energy output of the second DC power source in response to electrically connecting the DC power source, avoiding unnecessary switching between DC power sources. For example, the controller may be configured to control the energy storage system to supplement the electric energy output from the second DC power source while the second DC power source ramps up the electric energy output.

According to one embodiment, an automatic transfer switch may be used to transfer the load between two sources when load carrying source fails, or when the capacity of the load carrying source falls below the load demand.

A DC transfer switch may include two electrically operated electromechanical switches, i.e., contactors, relays or electrically operated DC circuit breakers in series with diodes. The cathode sides of the diodes may be shorted together and connected to a DC load or an AC/DC inverter of an AC load, while the anode side of each diode may be connected to an independent DC power source, such as a fuel cell DC bus. When the source is made up of two busses in a split bus configuration, then two of these circuits may be used, one on a positive bus and one on a negative bus. The diodes on the negative bus may be arranged in reverse direction to allow the current flow. The DC transfer switch may also contain a controller, which may monitors DC bus voltages and currents of each source and controls electrically the operated switches.

A storage module may be used to catch the load while the source supplying load is failed until the second source is connected. In fuel cell systems, a storage module, typically made up of batteries or ultracapacitors, may be provided to support grid independent step loads, as fuel cells typically don't follow loads instantaneously.

An example of the DC bus control for load following with a storage module may operate as follows.
 a) When power available from the DC power (e.g., fuel cell) source is more than the load power demand, then the DC power source DC/DC converter maintains the DC bus voltage at least at the threshold voltage (e.g., 390V), which is a pre-set steady-state output voltage for the DC bus when the DC power satisfies the load power demand (i.e., power requirement).
 b) When power available from the DC power source is less than the load power demand at any instant, then balance power may be drawn from a storage module. In this scenario, the storage module may output power to maintain the DC bus voltage at the base voltage (e.g., 375V), which is a voltage which is less than the threshold voltage, but which is sufficient to operate the load (e.g., at which the load power demand is satisfied).

Figure 4A:
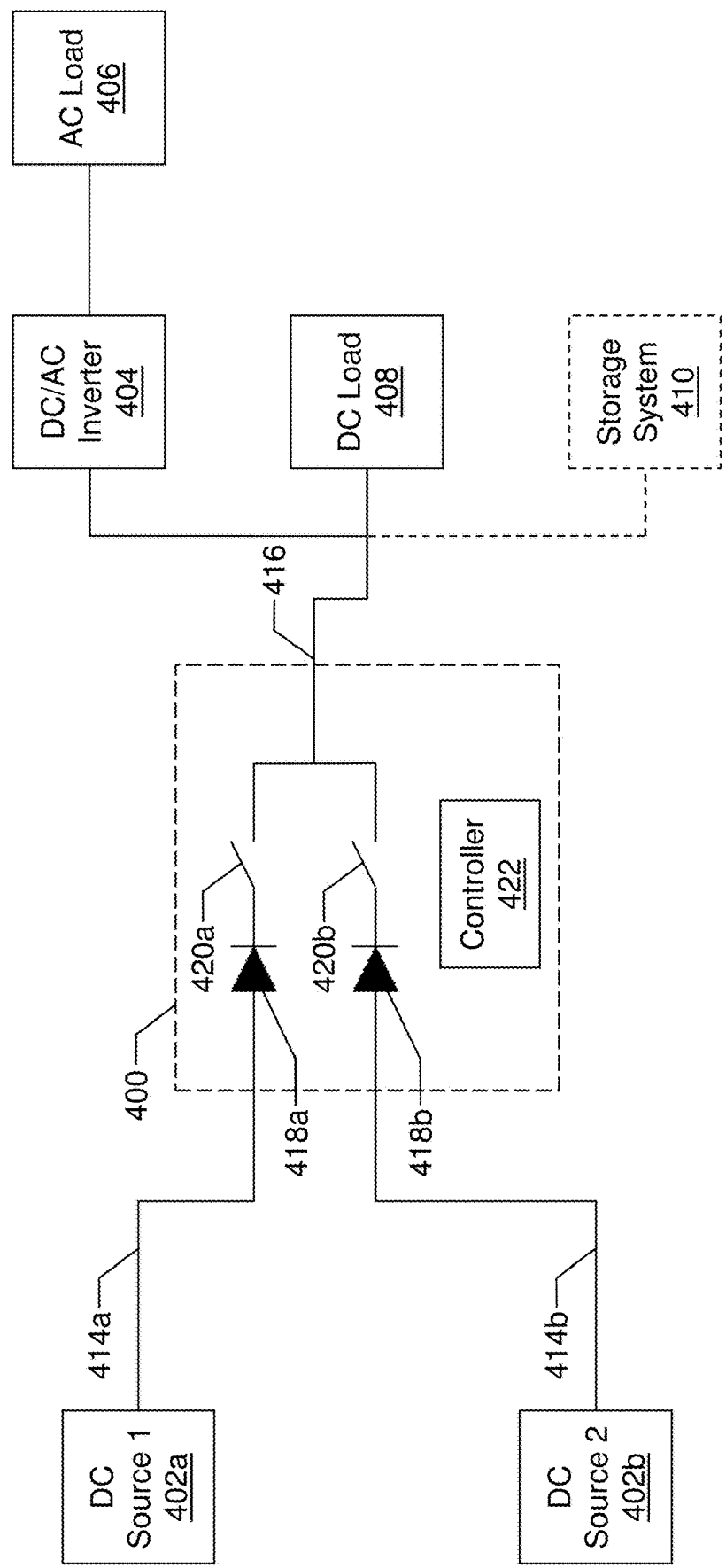
FIGS. 4A-4C are block circuit diagrams of a DC transfer unit having electromechanical electric connection devices for connecting sources and a load(s) suitable for implementing various embodiments.
Figure 4B:
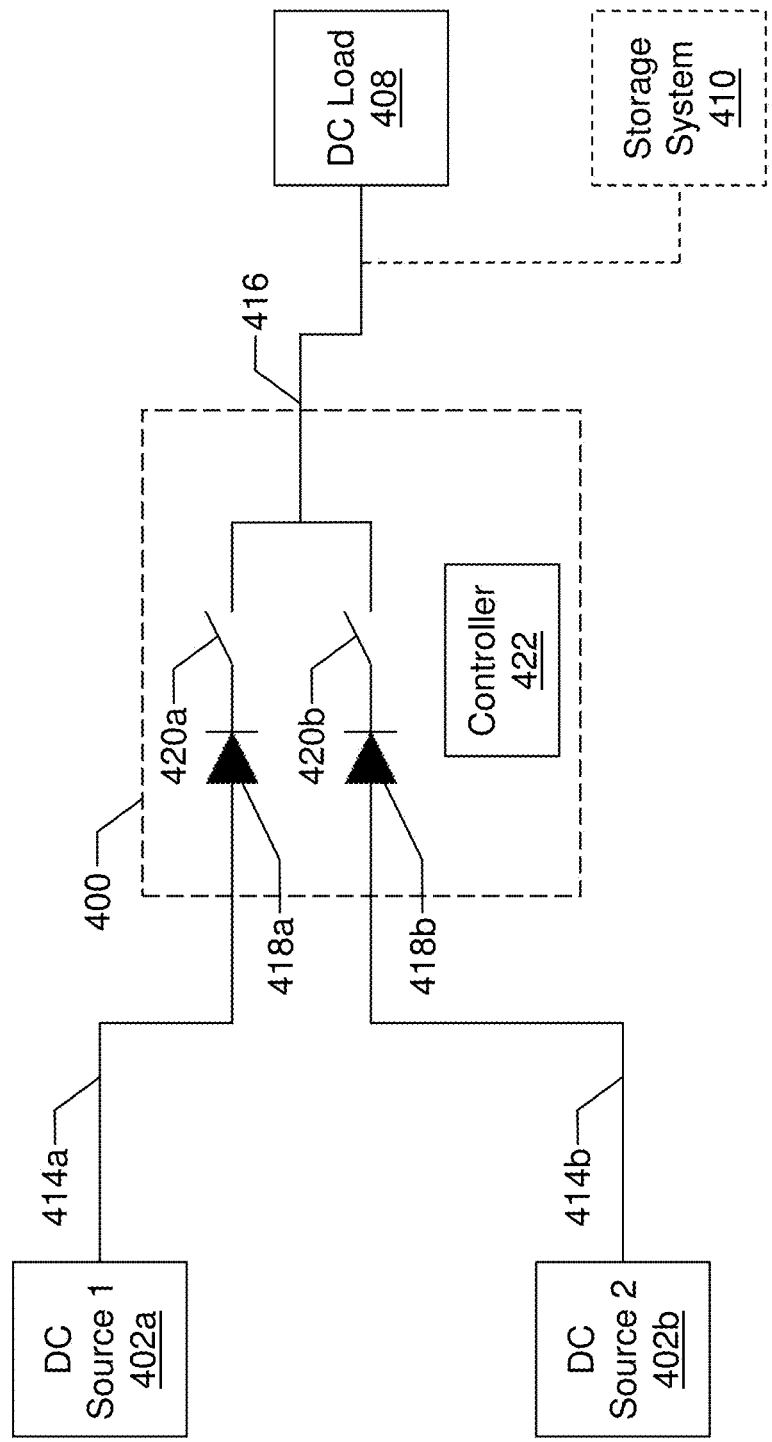
Figure 4C:
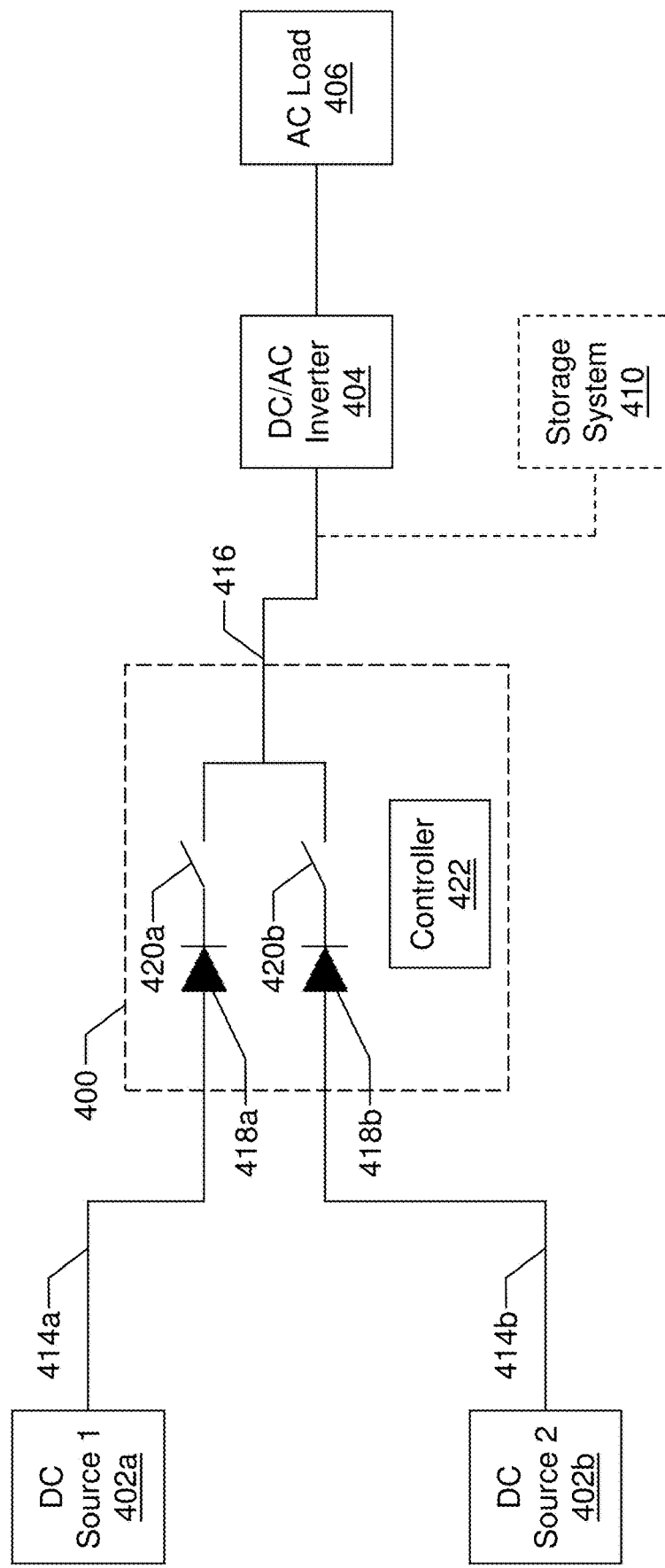

An exemplary method of operation 800 of a DC transfer switch with DC power sources, such as fuel cell power generators, is described in the below steps with reference to FIGS. 4A, 4B, 4C, 8 and 9. In FIG. 4A, there are two loads electrically connected to the DC transfer unit 400: an AC load 406 connected via an DC/AC inverter 404 and the DC load bus 416, and a DC load 408 connected via the DC load bus 416. FIG. 4B differs from FIG. 4A in that the AC load 406 and inverter 404 are omitted. FIG. 4C differs from FIG. 4A in that the DC load 408 is omitted.

Figure 9:
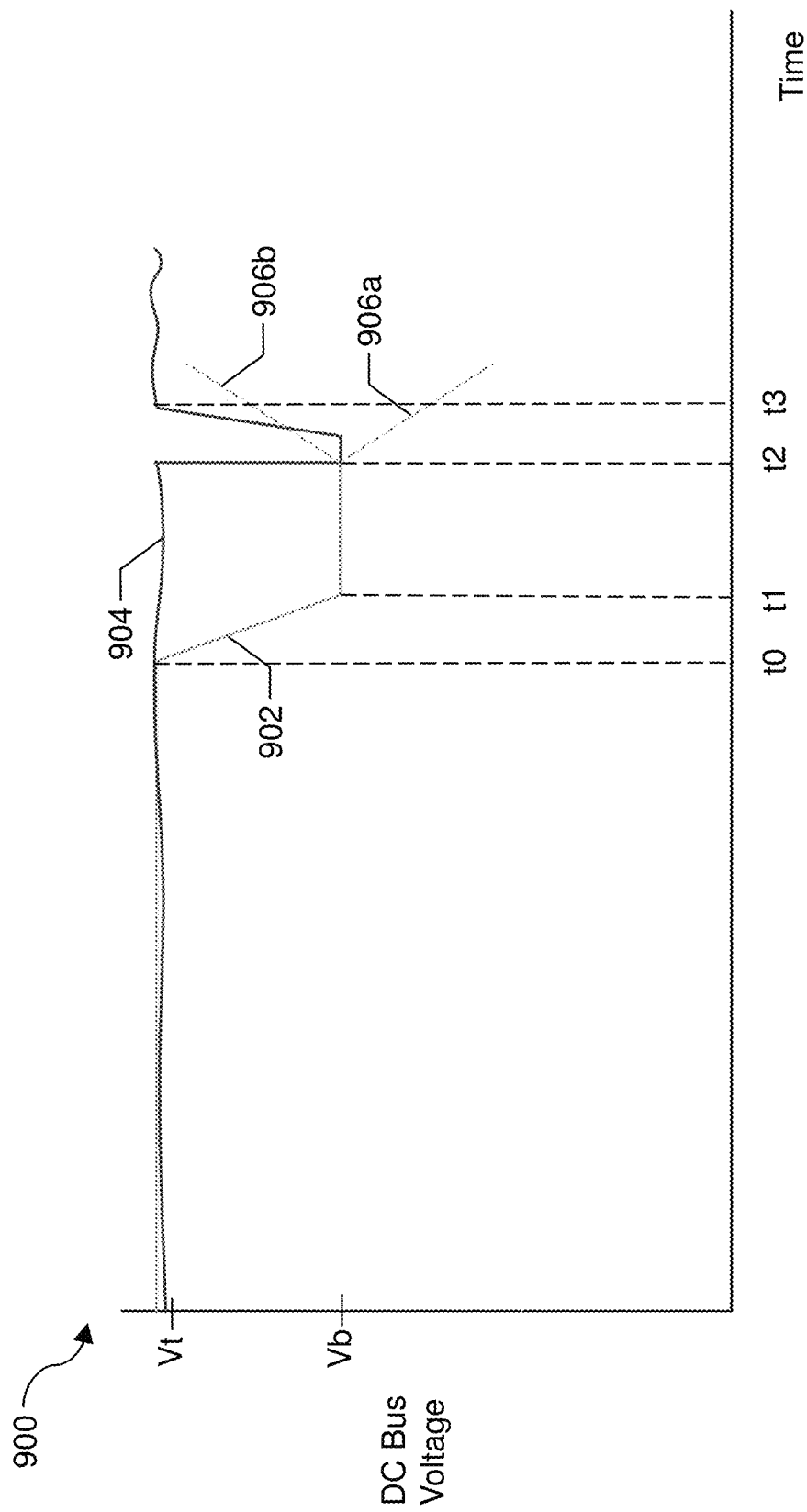
FIG. 9 is a plot of voltage versus time illustrating failure of a first DC power source and load transfer to a second DC power source according to various embodiments.

1. Initially, the first DC power source 402a is electrically connected to and is supplying all power (e.g., voltage 902 in FIG. 9) to the load 406, 408. In this scenario, a first connection device (e.g., electromechanical connection device, such as a switch, relay, circuit breaker, contactor, etc.) 420a is turned on (e.g., closed) and the second connection device 420b is turned off (e.g., open). Thus, the second DC power source 402b is electrically disconnected from the load 406, 408 and no power is coming out of the second DC power source 402. The first DC power source 402a may supply power to the load 406, 408 through first DC bus 414a and first diode 418a and the first connection device 420a combination. The first DC power source 402a may also provide additional power (e.g., voltage 902 in FIG. 9) to the storage system (e.g., battery, supercapacitor, etc.) 410 to charge it. The output voltage 902 magnitude equals to or greater than the threshold voltage (Vt). The second DC power source 402b outputs an output voltage 904, which may also equal to or be greater than the threshold voltage (Vt), as shown in FIG. 9. The controller 422 continuously monitors the output voltage 902 of the first DC power source 402a on the first DC bus 414a in step 802 of method 800 shown in FIG. 8. The controller 422 may also optionally continuously monitor the voltage on DC load bus 416 and/or the output voltage 904 of the second DC power source 402a (which is disconnected from the load) on the second DC bus 414b in step 804.

2. In step 806 of the method 800, the controller 422 determines whether output voltage 902 of the first DC power source 402a is below the threshold voltage (Vt). If the first DC power source 402a meets the load 406, 408 power demand, then the output voltage 902 of the first DC power source 402a is not below the threshold voltage (i.e., determination block 806="No"), and the controller 422 returns to step 802 in the method 800 in FIG. 8. However, if the first DC power source 402a does not meet the load 406, 408 power demand, then the output voltage 902 of the first DC power source 402a drops below the threshold voltage (i.e., determination block 806="Yes"). Referring to FIG. 9, when the first DC power source 402a fails to meet the load 406, 408 power demand at time t0, the output voltage 902 from the first DC power source 402a on the first DC bus 414a may start dropping immediately below the threshold voltage. As soon as the bus 414a and/or 416 voltage 902 drops to the base voltage (Vb) (e.g., 375V) at time t1, the controller 422 may activate the storage system 410 in step 808 of FIG. 8. The storage system 410 begins to output power to the load to meet the load power demand and to keep the voltage on the DC load bus 416 at the base voltage (e.g., 375V).

3. While the storage system 410 supplies at least part of the power to the load 406, 408 to meet the load power demand, the first DC power source 402a may react, for example, in two ways depending on its failure mode.
   a. For example, the first DC bus 414a voltage 902 output from the first DC power source 402a may collapse to zero (e.g., following line 906a in FIG. 9) of the first DC power source 402a completely fails.
   b. Alternatively, in a case of a capacity reduction of the first DC power source 402a, the first DC bus 414a voltage output from the first DC power source 402a may stay at the base voltage (e.g., 375V). The first DC power source 402a may continue to provide power to the load 406, 408 to partially satisfy the load power demand. The storage system 410 concurrently provides power to the load via the DC load bus 416 to satisfy the remainder of the load power demand. In other words, the first DC power source 402a may supply power at its reduced output capacity and the storage system 410 may provide the difference to satisfy the load power demand.

4. The controller 422 may continuously monitor the DC bus 414a and 414b voltages 902, 904 output by the first and second DC power sources 402a and 402b, respectively. In step 810 of method 800 in FIG. 8, the controller 422 determines whether the output voltage 904 of the second DC source 402b is below the threshold voltage. If the output of the determination block 810="yes", then the controller returns to block 802 and the storage system 410 may continue to provide power to the load 406, 408 to satisfy the load demand. If the controller 422 determines that the first DC bus 414a is outputting a voltage 902 that equals to the base voltage (e.g., 375V) or less from the first DC power source 402a, and the controller 422 determines that the second DC power source 402b is outputting a voltage 904 that at least equals the threshold voltage (e.g., 490V or another similar voltage, such as at least 485V, which is greater than the base voltage) on the second DC bus 414b (i.e., determination block 810="No"), then the controller 422 initiates power transfer to the load 406, 408 from the first DC power source 402a to the second DC power source 402b by turning on (e.g., closing) the second connection device 420b at time t2. Thus, in block 812 of method 800 in FIG. 8, the controller 422 controls the second connection device 420b to connect the second DC power source 402b to the load 406, 408.

5. At this point in time, both the first and the second connection devices 420a and 420b may be turned on (e.g., closed) and the circuit may work similar to a simple diode ORed circuit. Since the second DC power source 402b may be "healthy" by outputting a voltage on the second the second DC bus 414b which is equal to or greater than the threshold voltage (e.g., 390V), the load 406, 408 may be immediately transferred from the first DC power source 402a to the second power source 402b, as the second diode 418b anode may be at higher potential than the first diode 418a anode. If the second DC power source 402b can't accommodate the increased step load, then its output voltage 904 may start falling towards the base voltage (e.g., 375V) while the first DC power source 402a output capacitors are discharging.

6. In block 814 of the method 800 of FIG. 8, the controller 422 determines whether the output current of the first DC power source 402a is below a threshold current. A threshold current may be a current at which it is safe to turn off the first connection device 420a. If the determination block 814="No", then the controller returns to block 802. If the determination block 814="Yes", and as soon as the current from the first DC power source 402a drops below the threshold current, then the controller 422 may turn off (e.g., open) the first connection device 420a to disconnect the first DC power source 402a from the load 406, 408 in block 816 of method 800 in FIG. 8.
   a. The load 406, 408 may now be completely powered by the second power source 402b if the output voltage of the second DC power source 402b on the second DC bus 414b is at least at the threshold voltage (e.g., 390V), and the controller 422 may turn off the output power from the storage system 410.
   b. Alternatively, the output voltage of the second DC power source 402b on the second DC bus 414b is below the threshold voltage at time t2 (as shown in FIG. 9), such as at the base voltage (e.g., 375V) due to the load power demand level and the output capacity of the source DC power source 402b. In this case, the controller 422 continues to provide additional power on the DC load bus 416 from the storage system 410 until time t3 when the output voltage of the second DC power source 402b on the second DC bus 414b reaches the threshold voltage (e.g., 390V).

7. Additionally, the output voltage of the first DC power source 402a on the first DC bus 414a may recover to at least at the threshold voltage (e.g., 390V) following line 906b in FIG. 9. In this condition, it may appear to the controller 422 that the second DC power source 402b may have failed, as its output voltage may be at the base voltage (e.g., 375V), while the first DC power source 402a output voltage may be at least at the threshold voltage (e.g., 390V). However, the controller 422 is programmed to differentiate the failure condition of a DC power source versus a step load increase on the DC power source by determining rate of rise of the DC bus voltage and by continuously monitoring other events. For example, the controller may wait until a predetermined time (e.g., time t3) for the output voltage 904 from the second DC power source 402b to reach the threshold voltage and/or to determine if the output voltage 904 begins to ramp up at a certain rate prior to the predetermined time (e.g., time t3) before determining that the second DC power source 402b failed. The controller 422 supplies additional power from the storage system 410 to the load 406, 408 until the output voltage 904 from the second DC power source 402b reaches the threshold voltage.

8. Thus, during the above described transfer from the first DC power source 402a to the second DC power source 402b, the load 406, 408 may experience an acceptably small voltage sag (drop from the threshold voltage (e.g., 390V) to the base voltage (e.g., 375V)). Otherwise it may be a seamless transfer. Furthermore, the first connection device 420a may turn off (i.e., be opened) at much lower currents (or zero current), which improves its reliability.

Figure 5A:
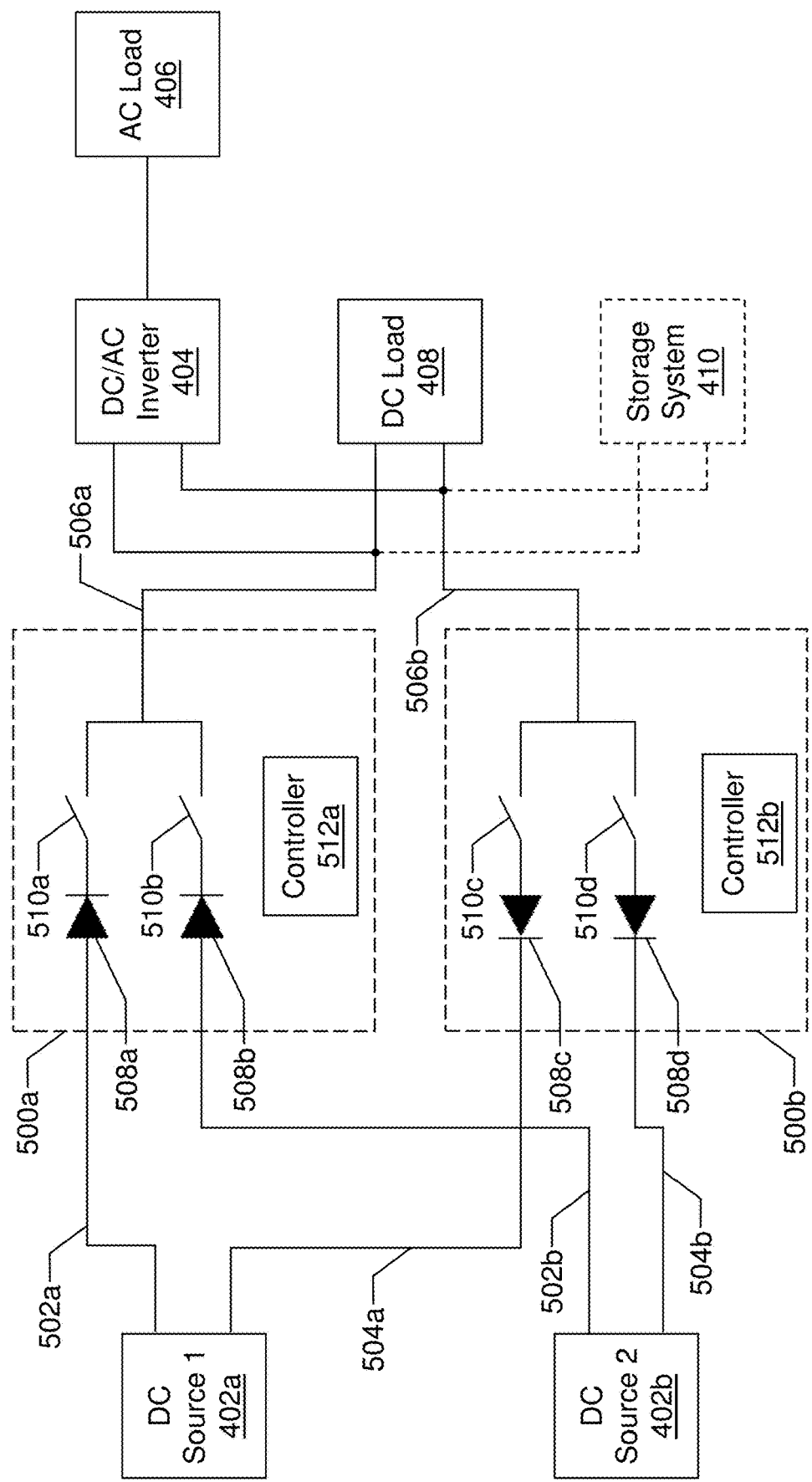
Figure 5B:
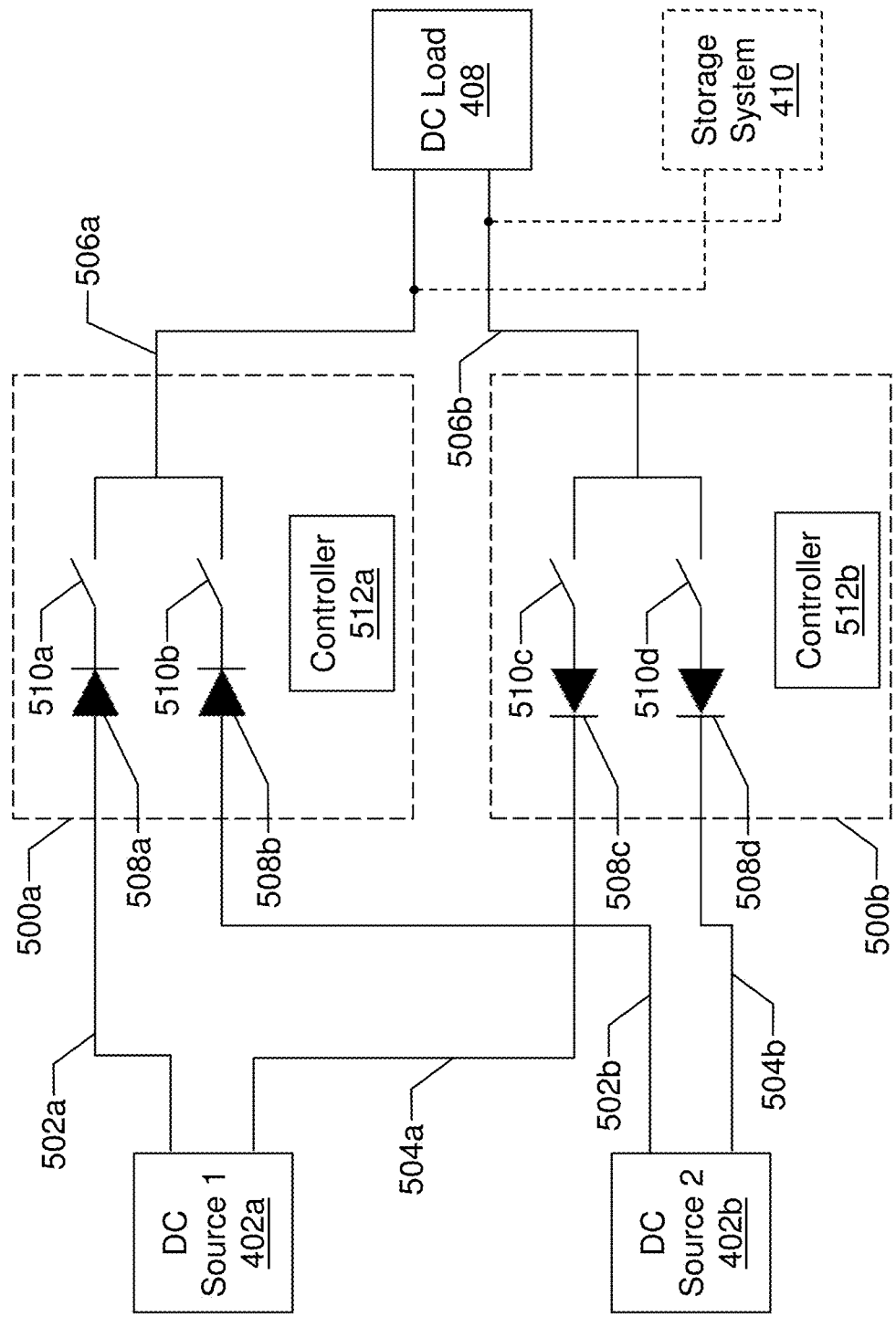
Figure 6A:
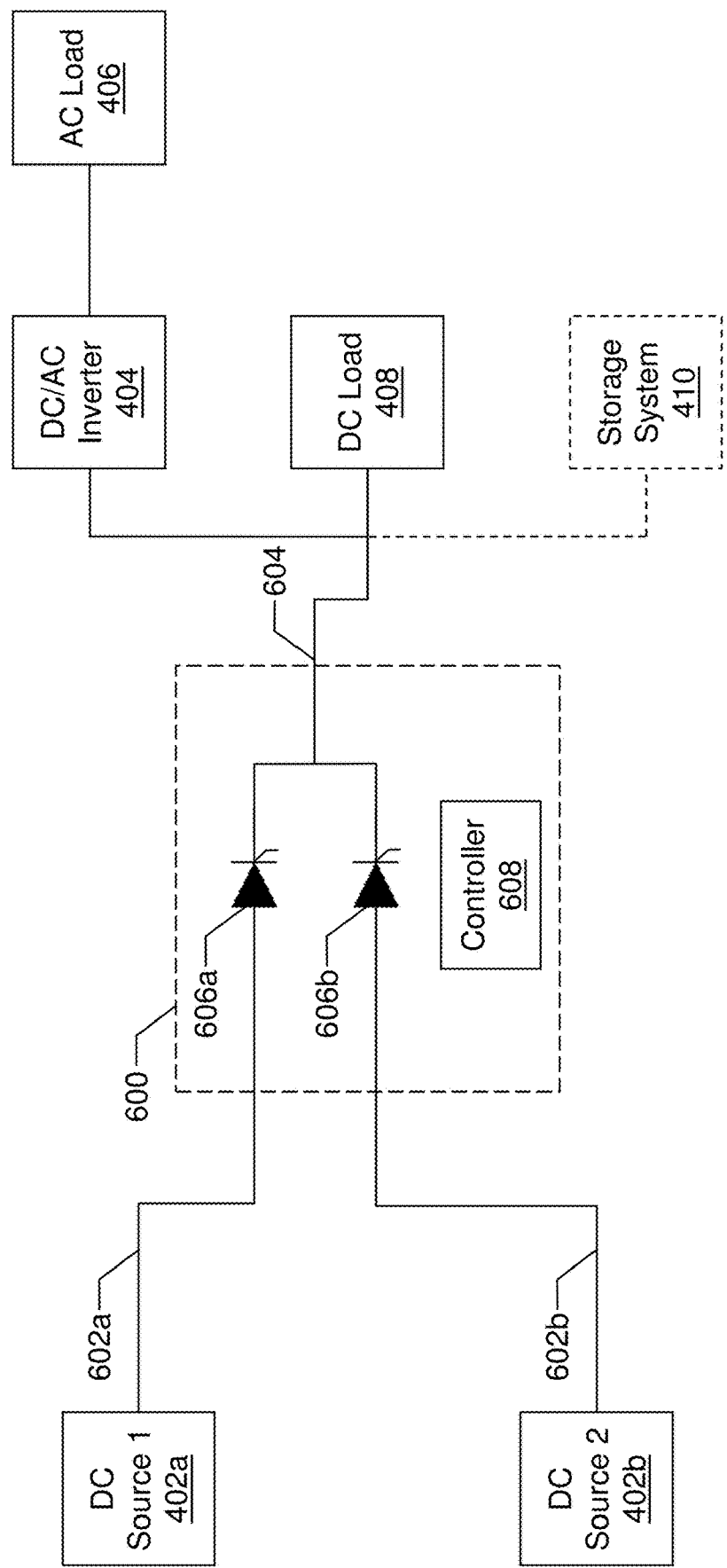
FIGS. 6A-6C are block circuit diagrams of a DC transfer unit having solid state electric connection devices for connecting sources and a load(s) suitable for implementing various embodiments.
Figure 6B:
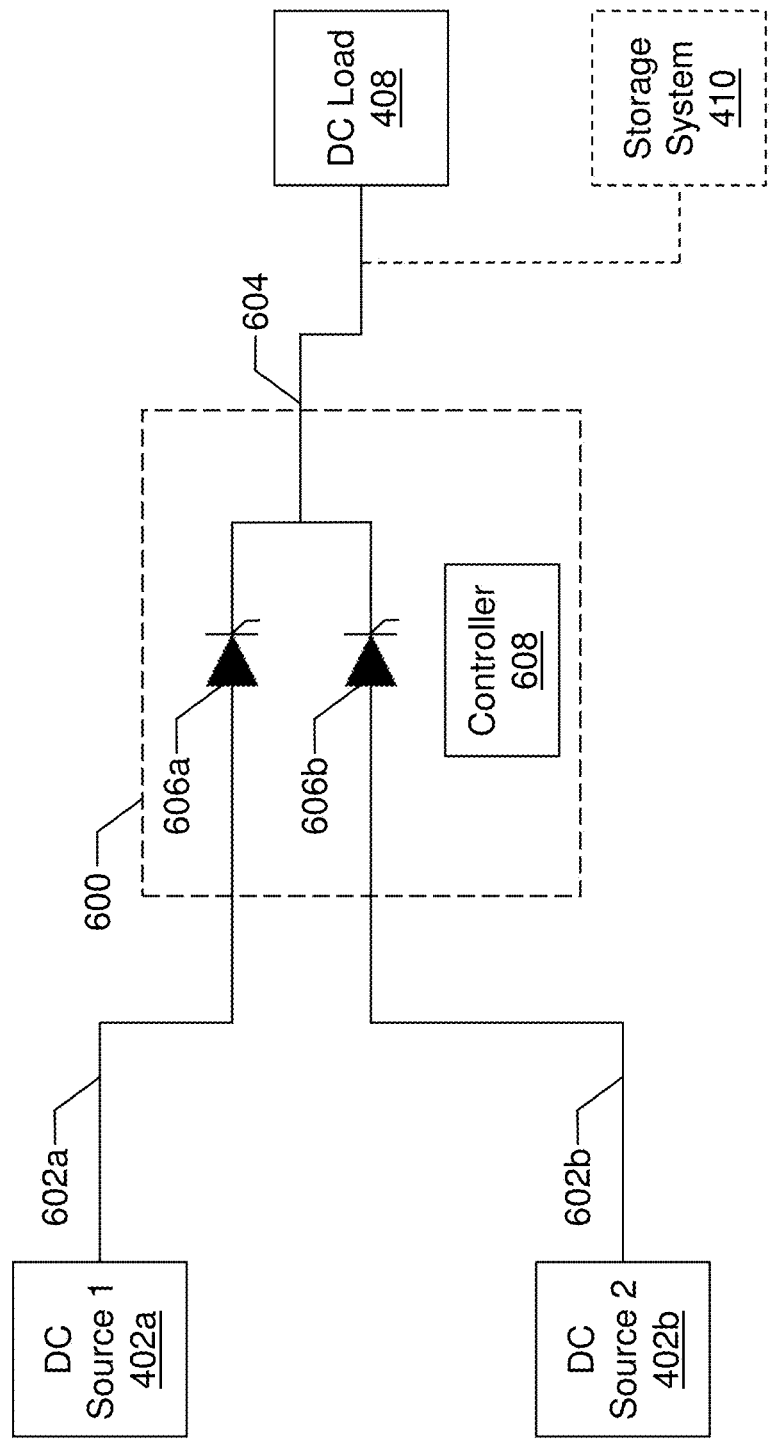
Figure 6C:
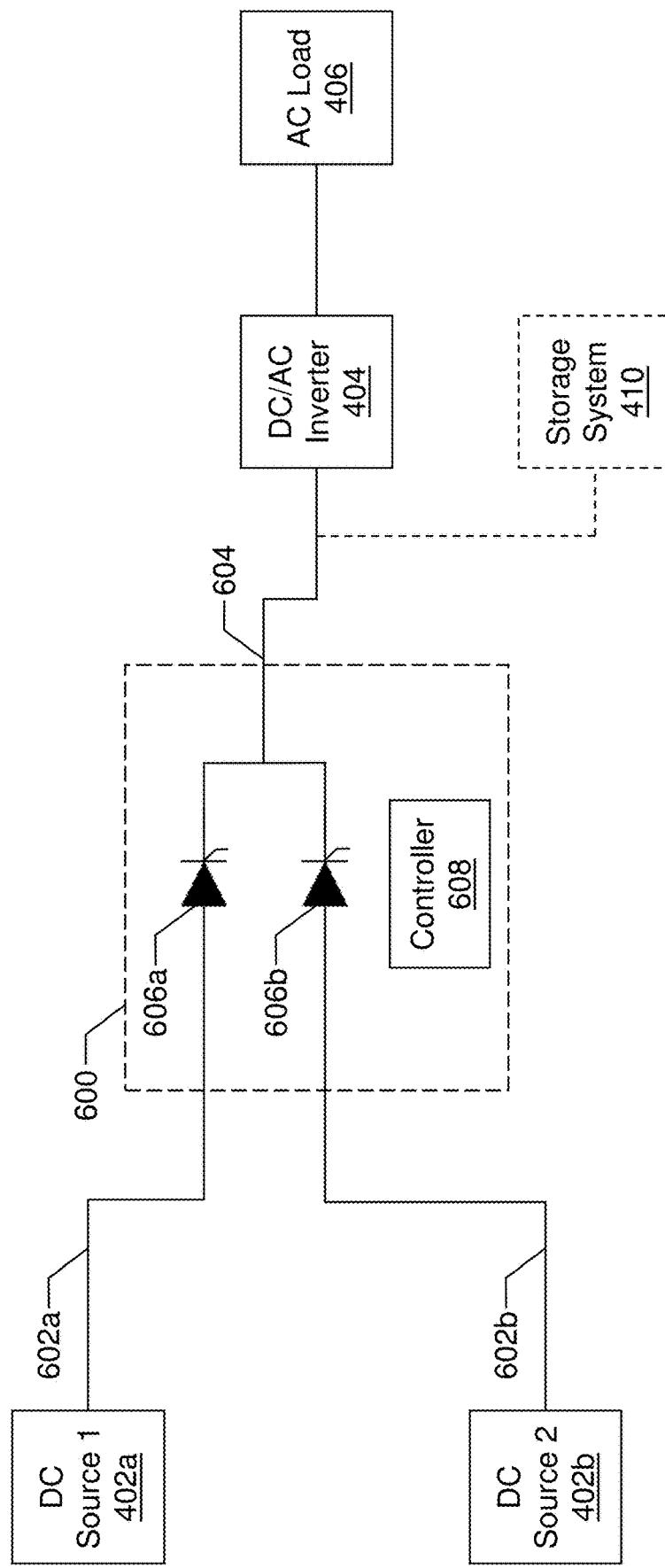

FIGS. 5A-5C differ from respective FIGS. 4A-4C in that the first and second DC buses 414a and 414b are replaced with respective split DC buses 502a, 504a, and 502b, 504b (i.e., respective positive DC buses 502a and 502b and negative DC buses 504a and 504b). The anode and cathode connections of diodes 508c and 508d on the negative DC buses 504a and 504b are reversed with respect to the anode and cathode connections of diodes 508a and 508b on the positive DC buses 502a and 502b.

Figure 7A:
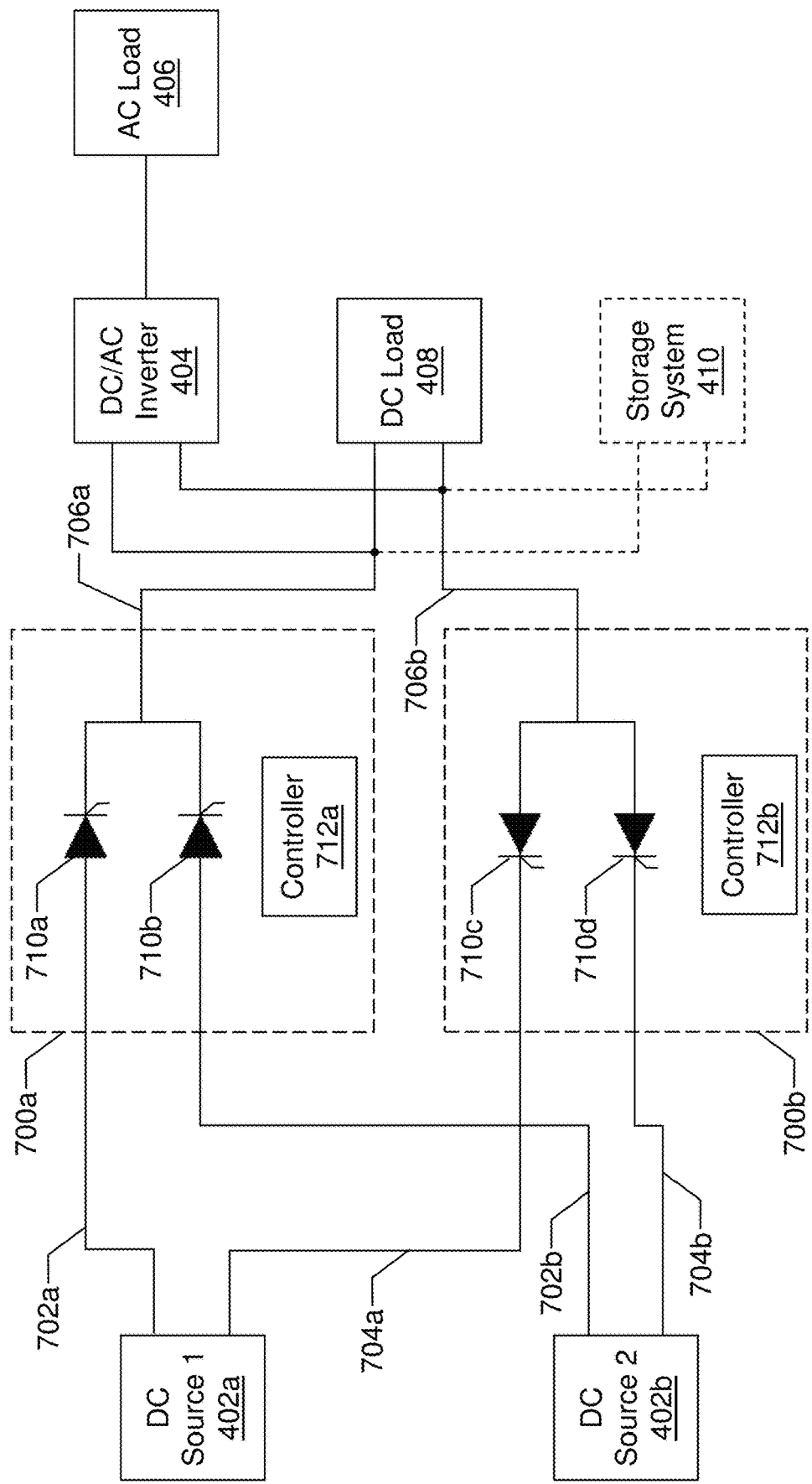
Figure 7C:
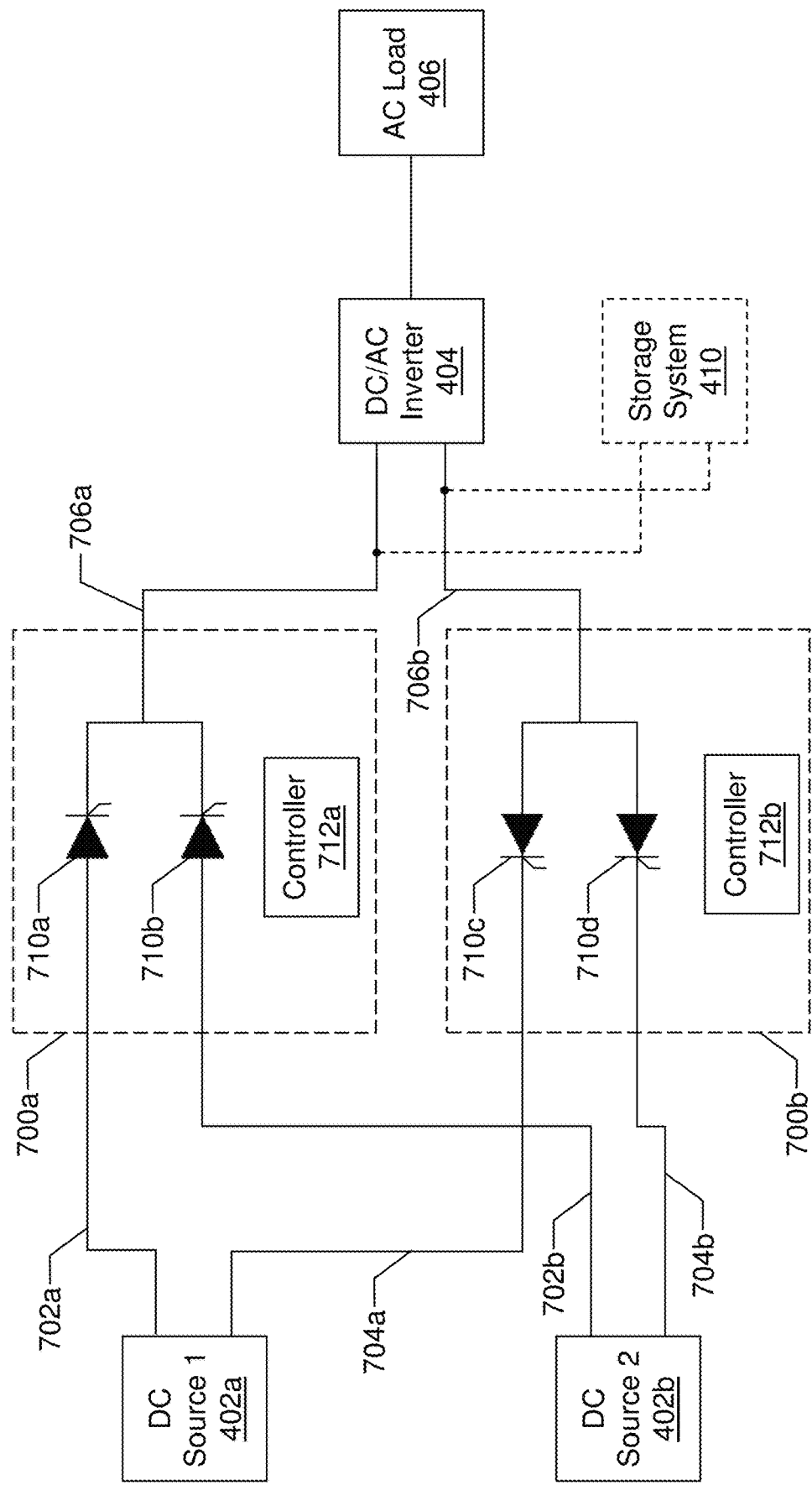
Figure 8:
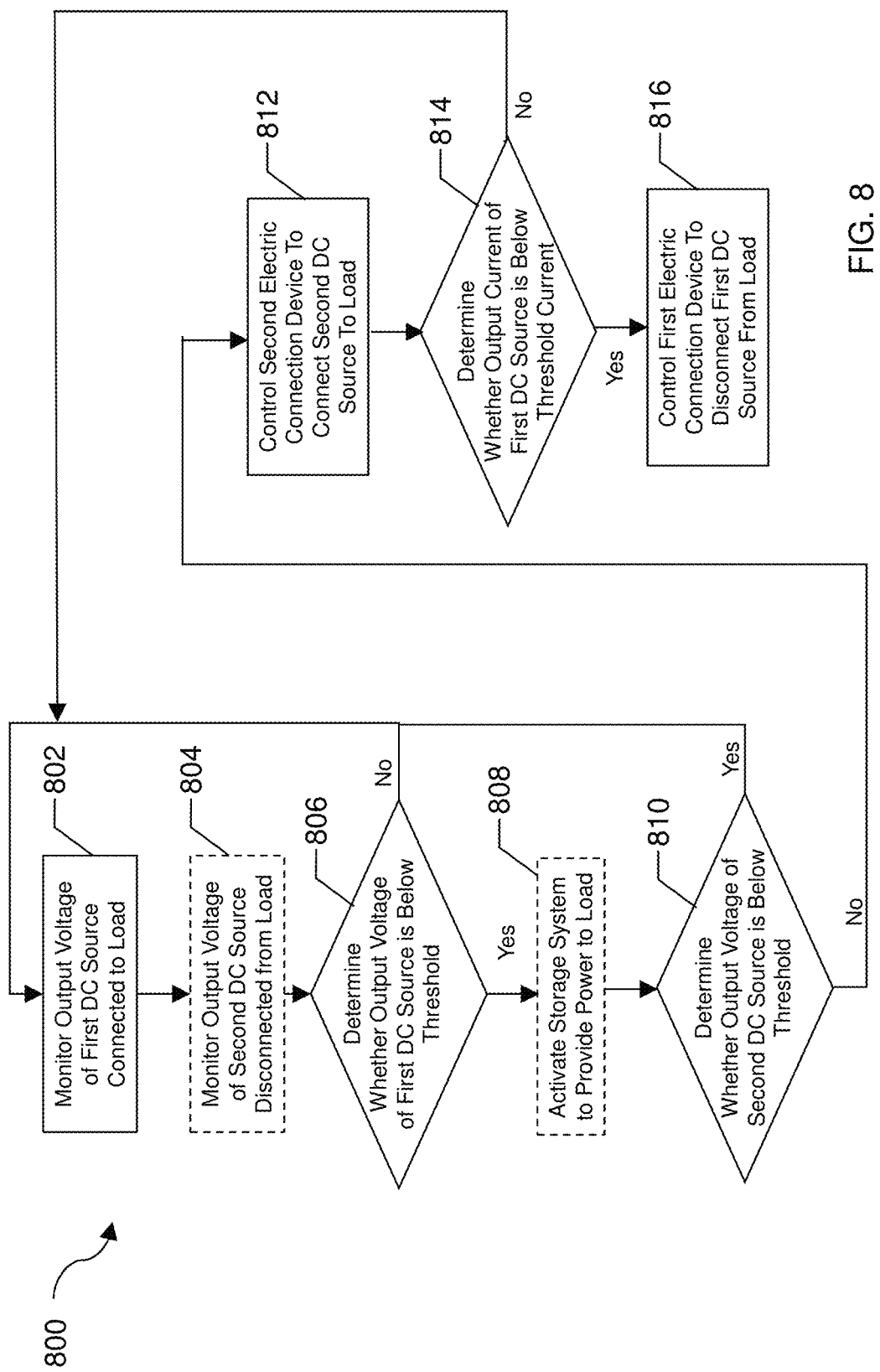
FIG. 8 is a process flow diagrams of a method according to various embodiments.

FIGS. 6A-6C and 7A-7C differ from respective FIGS. 4A-4C and 5A-5C in that the combination of diodes and electromechanical connection devices are replaced with solid state connection (i.e., switching) devices. The solid state switching devices (e.g., 606a and 606b, or 710a, 710b, 710c and 710d) may comprise thyristors, such as silicon controlled rectifiers (SCRs) If the DC bus is made up of two buses in a split bus configuration as shown in FIGS. 7A-7C, then two pairs of SCRs are used, with one pair per bus. SCRs are much faster devices compared to electromechanical devices. In the case of an SCR, the control signal to the outgoing SCR can be removed as soon as the incoming SCR is turned on, which typically takes microseconds. The outgoing SCR will be actually turned off when the current flowing through the SCR reaches zero current. In an alternative embodiment, the storage system 410 may be omitted in the case of DC power sources which can follow the load power demand instantaneously. The storage system 410 is used the case of fuel cell system power sources, to support step loads.

The DC transfer switches 400, 500a, 500b, 600, 700a and 700b have several benefits. They may use a storage system 410 to achieve seamless transfer between the DC power sources 402a and 402b. They also provide a method to differentiate between step load and actual DC power source failure where the DC power sources can't follow load power demand instantaneously. They provide a low cost solution to provide 2N redundancy with DC power sources. They offer high reliability and a much footprint compared to prior art devices. Finally, zero current switching available for electromechanical switches improves their reliability.

The functions and connections of the systems of FIGS. 4A-7C will now be described in more detail. The DC transfer units 400, 500a, 500b, 600, 700a, 700b may be configured to control electric connections between at least two DC power sources, for example, First DC power source 402a and Second DC power source 402b, and at least one load, for example AC load 406 and/or DC load 408. The DC transfer units 400, 500a, 500b, 600, 700a, 700b may include and/or be communicatively connected with a controller 422, 512a, 512b, 608, 712a, 712b configured to control the electric connections between the DC power sources 402a, 402b and the load 406, 408. The DC transfer units 400, 500a, 500b, 600, 700a, 700b may include at least one electric connection device, such as one, two, or four electric connection devices, for example, combinations of diodes 418a, 418b, 508a, 508b, 508c, 508d and electromechanical electric connection devices 420a, 420b, 510a, 510b, 510c, 510d, and/or solid state electric connection devices 606a, 606b, 710a, 710b, 710c, 710d.

The examples illustrated in FIGS. 4A-7C and described herein include one or two DC transfer units 400, 500a, 500b, 600, 700a, 700b, each having one controller 422, 512a, 512b, 608, 712a, 712b and two or four electric connection devices 418a, 418b, 420a, 420b, 508a-508d, 510a-510d, 606a, 606b, 710a-710d, the amounts and combinations of which do not limit the scope of the claims and the descriptions. One of ordinary skill in the art would understand that the number of each of the components may be greater than or less than the number of each of the components in these examples and that the components may be differently arranged than the arrangements in these examples. For example, a DC transfer unit 400, 500a, 500b, 600, 700a, 700b having one controller 422, 512a, 512b, 608, 712a, 712b may be arranged as a DC transfer unit sharing a controller with another DC transfer unit. In another example, a DC transfer unit 400, 500a, 500b, 600, 700a, 700b having one controller 422, 512a, 512b, 608, 712a, 712b and two or four electric connection devices 418a, 418b, 420a, 420b, 508a-508d, 510a-510d, 606a, 606b, 710a-710d may be arranged as two DC transfer units each having one controller or sharing one controller, and each having one or two electric connection devices. In another example, two DC transfer units 500a, 500b, 700a, 700b each having one controller 512a, 512b, 712a, 712b and two electric connection devices 510a-510d, 710a-710d may be arranged as once DC transfer unit having one or more controllers, and having four electric connection devices.

The DC transfer units 400, 500a, 500b, 600, 700a, 700b may be electrically connectable to at least one DC power source 402a, 402b via a source bus, such as a DC source bus 414a, 414b, 602a, 602b or a DC split source bus having a positive source bus 502a, 502b, 702a, 702b and a negative source bus 504a, 504b, 704a, 704b. The DC transfer units 400, 500a, 500b, 600, 700a, 700b may be electrically connectable to at least one load 406, 408 via a load bus, such as a DC load bus 416, 604 or a DC split load bus having a positive load bus 506a, 706a and a negative load bus 506b, 706b. The DC transfer units 400, 500a, 500b, 600, 700a, 700b may be electrically connectable to at least one AC load 406 via a DC/AC inverter 404 that may be electrically connectable to the load bus 416, 506a, 506b, 604, 706a, 706b.

In some embodiments, the DC transfer units 400, 500a, 500b, 600, 700a, 700b may be electrically connectable to at least one storage system 410 via the load bus 416, 506a, 506b, 604, 706a, 706b. In some embodiments, the storage system 410 may be electrically connected to at least one load 406, 408 via the load bus 416, 506a, 506b, 604, 706a, 706b. The storage system 410 may be an optional component. For example, the storage system may be included for systems having non-instantaneous load following DC power sources 402a, 402b, such as fuel cells 45. The DC power sources 402a, 402b may also include DC/DC converters and/or capacitors electrically connected to electrical outputs of the fuel cells 45. The controller 422, 512a, 512b, 608, 712a, 712b of a DC transfer unit 400, 500a, 500b, 600, 700a, 700b may be configured to signal or control a storage system 410 to support the electric energy output of a DC power source 402a, 402b. For example, the controller 422, 512a, 512b, 608, 712a, 712b may signal or control the storage system 410 to support the electric energy output of a DC power source 402a, 402b in response to the electric energy output of the DC power source 402a, 402b being insufficient to support a load 406, 408, such as for a failed DC power source 402a, 402b and/or for a DC power source 402a, 402b ramping up the electric energy output to support the load 406, 408. The storage system 410 may support the electric energy output of a DC power source 402a, 402b by outputting electric energy sufficient to maintain a combined electric energy output of the DC power source 402a, 402b and the storage system 410 at a specified level.

The controller 422, 512a, 512b, 608, 712a, 712b may be configured to signal or control the electric connection devices 420a, 420b, 510a-510d, 606a, 606b, 710a-710d to electrically connect the DC power sources 402a, 402b to and disconnect the DC power sources 402a, 402b from the load 406, 408. In some embodiments, the controller 422, 512a, 512b, 608, 712a, 712b may be configured to signal or control the electric connection devices 420a, 420b, 510a-510d, 606a, 606b, 710a-710d to electrically connect the DC power sources 402a, 402b to and disconnect the DC power sources 402a, 402b from the storage system 410. Each electromechanical electric connection devices 420a, 420b, 510a-510d may be an electrically controllable switch, relay, circuit breaker, contactor, etc. Each solid state electric connection devices 606a, 606b, 710a-710d may be a thyristor, such as silicon controlled rectifier (SCR).

The electric connection devices 418a, 418b, 420a, 420b, 508a-508d, 510a-510d, 606a, 606b, 710a-710d may electrically connect the DC power sources 402a, 402b to and disconnect the DC power sources 402a, 402b from the load 406, 408 by electrically connecting or disconnecting a source bus 414a, 414b, 502a, 502b, 504a, 504b, 602a, 602b, 702a, 702b, 704a, 704b and a load bus 416, 506a, 506b, 604, 706a, 706b. Electric energy output from a DC source 402a, 402b may be provided to a load 406, 408 via the electric connection devices 418a, 418b. 420a, 420b, 508a-508d, 510a-510d, 606a, 606b, 710a-710d and the connected source bus 414a, 414b, 502a, 502b, 504a, 504b, 602a, 602b, 702a, 702b, 704a, 704b and load bus 416, 506a, 506b, 604, 706a, 706b.

A load carrying DC source may be the DC source 402a, 402b electrically connected to at least one load 406, 408 by the DC transfer units 400, 500a, 500b, 600, 700a, 700b and proving electric energy to the load 406, 408. In other words, the controller 422, 512a, 512b, 608, 712a, 712b for the DC transfer unit 400, 500a, 500b, 600, 700a, 700b may signal or control one or more electric connection devices 420a, 420b, 510a-510d, 606a, 606b, 710a-710d to electrically connect the load carrying DC source to the load 406, 408. The following examples are described using the example of the DC source 402a initially being the load carrying DC source and the DC 402b being initially disconnected from the load 406, 408 by the DC transfer units 400, 500a, 500b, 600, 700a, 700b. In other words, the controller 422, 512a, 512b, 608, 712a, 712b may signal or control one or more electric connection devices 420a, 510a, 510c, 606a, 710a, 710c to electrically connect the DC source 402a to the load 406, 408. The controller 422, 512a, 512b, 608, 712a, 712b may signal or control one or more electric connection devices 420b, 510b, 510d, 606b, 710b, 710d to electrically disconnect the DC source 402b from the load 406, 408. In some embodiments, the controller 422, 512a, 512b, 608, 712a, 712b signals or control may include transmission of a wired or wireless electric signal or absence of transmission of an electric signal.

The controller 422, 512a, 512b, 608, 712a, 712b for the DC transfer unit 400, 500a, 500b, 600, 700a, 700b may monitor the levels of electric energy on the source bus 414a, 414b, 502a, 502b, 504a, 504b, 602a, 602b, 702a, 702b, 704a, 704b. The controller 422, 512a, 512b, 608, 712a, 712b may monitor the levels of any of electric voltage, current, and/or power. The controller 422, 512a, 512b, 608, 712a, 712b may determine from the electric energy of the source bus 414a, 502a, 504a, 602a, 702a, 704a whether the electric energy provided by the load carrying DC source 402a is insufficient. For example, the controller 422, 512a, 512b, 608, 712a, 712b may compare the electric energy of the source bus 414a, 502a, 504a, 602a, 702a, 704a to a load threshold, which may represent a level of electric energy that is at least equal to the load demand of the load 406, 408. In response to determining that the electric energy of the source bus 414a, 502a, 504a, 602a, 702a, 704a is insufficient, the controller 422, 512a, 512b, 608, 712a, 712b may signal or control the electric connection device 420b, 510b, 510d, 606b, 710b, 710d to electrically connect the DC source 402b to the load 406, 408.

In some embodiments, the DC source 402b may be a non-instantaneous load following DC source, such as a fuel cell power generator that may need time to ramp up electric energy output to satisfy the load demand of the load 406, 408. To prevent interruption of the operability of the load 406, 408 as the electric energy output of the load carrying DC source 402a becomes insufficient and the electric energy output of the newly connected DC source 402b is not yet sufficient, a storage system 410 may output stored electric energy to supplement the electric energy output of the load carrying DC source 402a. The amount of stored electric energy output by the storage system 410 may be sufficient to maintain the electric energy supplied to the load 406, 408 at least at the load threshold. The storage system 410 may provide stored electric energy output to the load 406, 408 via a load bus 416, 506a, 506b, 604, 706a, 706b. In some embodiments, the controller 422, 512a, 512b, 608, 712a, 712b may signal or control the storage system 410 to output the stored electric energy to supplement the electric energy output by the load carrying DC source 402a. In some embodiments, the storage system 410 may be controlled by a separate controller (not shown) configured to monitor the load bus 416, 506a, 506b, 604, 706a, 706b. The separate controller may monitor the levels of any of electric voltage, current, and/or power. The separate controller may determine from the electric energy of the load bus 416, 506a, 506b, 604, 706a, 706b whether the electric energy provided by the load carrying DC source 402a is insufficient. For example, the separate controller may compare the electric energy of the load bus 416, 506a, 506b, 604, 706a, 706b to the load threshold. In response to determining that the electric energy of the load bus 416, 506a, 506b, 604, 706a, 706b is insufficient, the separate controller may signal or control the storage system 410 to output stored electric energy to the load 406,408.

In some embodiments, the controller 422, 512a, 512b, 608, 712a, 712b may determine from the electric energy of the source bus 414b, 502b, 504b, 602b, 702b, 704b whether the electric energy provided by the connected DC source 402b is sufficient. For example, the controller 422, 512a, 512b, 608, 712a, 712b may compare the electric energy of the source bus 414b, 502b, 504b, 602b, 702b, 704b to the load threshold. In response to determining that the electric energy of the source bus 414a, 502a, 504a, 602a, 702a, 704a is insufficient and that the electric energy of the source bus 414b, 502b, 504b, 602b, 702b, 704b is sufficient, the controller 422, 512a, 512b, 608, 712a, 712b may signal or control the electric connection device 420a, 510a, 510c, 606a, 710a, 710c to electrically disconnect the load carrying DC source 402a from the load 406, 408. In response to disconnecting the load carrying DC source 402a, the DC source 402b may become the load carrying DC source 402b.

In some embodiments, the controller 608, 712a, 712b for the DC transfer unit 600, 700a, 700b may signal or control the electric connection device 606a, 710a, 710c to electrically disconnect the load carrying DC source 402a from the load 406, 408 in response to connecting the DC source 402b to the load 406, 408. In response to disconnecting the load carrying DC source 402a, the DC source 402b may become the load carrying DC source 402b. Such embodiments may be implemented, for example, for an instantaneous load following DC source 402b.

The electric connection devices 418a, 418b, 420a, 420b, 508a-508d, 510a-510d, 606a, 606b, 710a-710d may control the flow of electric energy through the DC transfer units 400, 500a, 500b, 600, 700a, 700b. For example, the electromechanical electric connection devices 420a, 420b, 510a-510d may control whether a circuit between the DC source 402a, 402b and the load 406, 408 is physically open or closed. The controller 422, 512a, 512b, 608, 712a, 712b may signal or control the electromechanical electric connection devices 420a, 420b, 510a-510d to open or close the circuit between the DC source 402a, 402b and the load 406, 408. In another example, the controller 422, 512a, 512b, 608, 712a, 712b may signal or control the solid state electric connection devices 606a, 606b, 710a-710d to turn on, allowing the flow of electric energy, or to turn off, preventing the flow of electric energy. The solid state electric connection devices 606a, 606b, 710a-710d may also turn off without signal or control by the controller 422, 512a, 512b, 608, 712a, 712b in response to no current passing through the solid state electric connection devices 606a, 606b, 710a-710d.

In embodiments for which the DC source 402b may be a non-instantaneous load following DC source, in response becoming the load carrying DC source 402b, the controller 422, 512a, 512b, 608, 712a, 712b may determine from the electric energy of the source bus 414b, 502b, 504b, 602b, 702b, 704b whether the electric energy output of the load carrying DC source 402b experiences a transient drop that requires support from the storage system 410. To prevent interruption of the operability of the load 406, 408 as the electric energy output of the load carrying DC source 402b may be insufficient during the transition, the storage system 410 may output stored electric energy to supplement the electric energy output of the load carrying DC source 402b. The amount of stored electric energy output by the storage system 410 may be sufficient to maintain the electric energy supplied to the load 406, 408 at least at the load threshold. In some embodiments, the controller 422, 512a, 512b, 608, 712a, 712b may compare the electric energy of the source bus 414b, 502b, 504b, 602b, 702b, 704b to a transient threshold, which may represent a level of electric energy that is at least equal to the load demand of the load 406, 408. In response to determining that the electric energy of the source bus 414b, 502b, 504b, 602b, 702b, 704b falls below the transient threshold, or is insufficient, the controller 422, 512a, 512b, 608, 712a, 712b may signal or control the storage system 410 to output the stored electric energy to supplement the electric energy output by the load carrying DC source 402b. In some embodiments, the storage system 410 may be controlled by a separate controller (not shown) configured to monitor the load bus 416, 506a, 506b, 604, 706a, 706b. The separate controller may monitor the levels of any of electric voltage, current, and/or power. The separate controller may determine from the electric energy of the load bus 416, 506a, 506b, 604, 706a, 706b whether the electric energy provided by the load carrying DC source 402b is insufficient. For example, the separate controller may compare the electric energy of the load bus 416, 506a, 506b, 604, 706a, 706b to the transient threshold. In response to determining that the electric energy of the load bus 416, 506a, 506b, 604, 706a, 706b is insufficient, the separate controller may signal or control the storage system 410 to output stored electric energy to the load 406,408. In some embodiments, extra electric energy output from the load carrying DC source 402a, 402b may be provided to the storage system 410 to charge a storage device (not shown) of the storage system 410.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements, including the control device as well as controllers 422, 512a, 512b, 608, 712a, 712b described herein, may be implemented using computing devices (such as computer) that include programmable processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a control device that may be or include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use any of the described embodiments. Various modifications to these embodiments will be readily apparent to those skilled in the art, and the generic principles defined herein may be applied to other embodiments without departing from the scope of the disclosure. Thus, the claims are not intended to be limited to the embodiments shown herein but are to be accorded the widest scope consistent with the claim language and the principles and novel features disclosed herein.

The invention claimed is:

1. A power generation method, comprising:
providing power from a first DC power source to a load via a combination of a first electromechanical connection device electrically connected in series with a first diode, while a second DC power source is electrically disconnected from the load;
monitoring a level of electric energy of a first source bus that is provided to the first source bus by the first DC power source, comparing the level of electric energy of the source bus to a load threshold, which represents a level of electric energy that is at least equal to a load demand of the load, and determining if the first DC power source does not satisfy a load power demand of the load based on the comparing the level of electric energy of the source bus to the load threshold;
determining if an output voltage from the second DC power source is not below the load threshold;
determining if an output current of the first DC power source is below a threshold current;
electrically connecting the second DC power source to the load via a combination of a second electromechanical connection device electrically connected in series with a second diode and providing power from the second DC power source to the load in response to determining that the level of electric energy of the source bus is below the load threshold, that the first DC power source does not satisfy the load power demand of the load, and that the output voltage from the second DC power source is not below the load threshold; and
electrically disconnecting the first DC power source from the load in response to determining that the output current of the first DC power source is below the threshold current.

2. The method of claim 1, wherein:
both the first and the second DC power sources are electrically connected to the load for a period of time between electrically connecting the second DC power source to the load and electrically disconnecting the first DC power source from the load; and
the load is transferred to receive power from the second DC power source after the step of electrically connecting the second DC power source to the load while both the first and the second DC power sources are electrically connected to the load.

3. The method of claim 1, further comprising activating a storage system to provide power to the load to meet the load power demand when in response to determining that the output voltage from the first DC power source dropped below the load threshold.

4. The method of claim 3, wherein:
the step of activating the storage system occurs when the output voltage from the first DC power source drops to a base voltage which is less than the load threshold; and
the storage system provides power to the load through a load bus such that a voltage on the load bus equals to the base voltage.

5. The method of claim 4, wherein a combination of the first DC power source and the storage system provide power to the load to meet the load power demand.

6. The method of claim 4, further comprising deactivating the storage system to stop providing power to the load in response to determining that the output voltage from the second DC power source remains above the load threshold after electrically connecting the second DC power source to the load, wherein the voltage on the load bus is at least equal to the load threshold after deactivating the storage system.

7. The method of claim 4, wherein in response to determining that the output voltage from the second DC power source dropped below the load threshold after electrically connecting the second DC power source to the load, then continuing providing power to the load from the storage system until the output voltage from the second DC power source again reaches the load threshold.

8. The method of claim 1, wherein the first and the second DC power sources comprise fuel cell power generators.

9. The method of claim 1, wherein:
electrically disconnecting the first DC power source from the load comprises turning off the combination of the first electromechanical connection device electrically connected in series with the first diode; and
electrically connecting the second DC power source to the load comprises turning on the combination of the second electromechanical connection device electrically connected in series with the second diode.

10. A power generation system, comprising:
a first DC power source electrically connected to a first DC transfer switch comprising a combination of a first electromechanical connection device electrically connected in series with a first diode;
a second DC power source electrically connected to a second DC transfer switch comprising a combination of a second electromechanical connection device electrically connected in series with a second diode; and
a controller configured to:
turn on the first DC transfer switch via the combination of the first electromechanical connection device electrically connected in series with the first diode to provide power from the first DC power source to a load, while the second DC transfer switch is turned off such that the second DC power source is electrically disconnected from the load;
monitor a level of electric energy of a first source bus that is provided to the first source bus by the first DC power source, compare the level of electric energy of the source bus to a load threshold, which represents a level of electric energy that is at least equal to a load demand of the load, and determine if the first DC power source does not satisfy a load power demand of the load based on the comparing the level of electric energy of the source bus to the load threshold;

determine if an output voltage from the second DC power source is not below the load threshold;

determine an output current of the first DC power source is below a threshold current;

turn on the second DC transfer switch to electrically connect the second DC power source to the load via the combination of the second electromechanical connection device electrically connected in series with the second diode and provide power from the second DC power source to the load in response to determining that the level of electric energy of the source bus is below the load threshold, that the first DC power source does not satisfy the load power demand of the load, and that the output voltage from the second DC power source is not below the load threshold; and turn off the first DC transfer switch to electrically disconnect the first DC power source from the load in response to determining that the output current of the first DC power source is below the threshold current.

11. The system of claim 10, wherein the controller is further configured to keep both the first and the second DC power sources electrically connected to the load for a period of time between electrically connecting the second DC power source to the load and electrically disconnecting the first DC power source from the load.

12. The system of claim 10, wherein the controller is further configured to activate a storage system to provide power to the load to meet the load power demand in response to determining that the output voltage from the first DC power source dropped below the load threshold.

13. The system of claim 12, wherein:
the storage system is activated when the controller determines that the output voltage from the first DC power source drops to a base voltage which is less than the load threshold; and
the storage system is configured to provide power to the load through a load bus such that a voltage on the load bus equals to the base voltage.

14. The system of claim 13, wherein the controller is further configured to deactivate the storage system to stop providing power to the load when the output voltage from the second DC power source remains above the load threshold after the second DC power source is electrically connected to the load, wherein the voltage on the load bus is at least equal to the load threshold after the storage system is deactivated.

15. The system of claim 13, wherein the controller is further configured to continue providing power to the load from the storage system until the output voltage from the second DC power source again reaches the load threshold in response to the controller determining that the output voltage from the second DC power source drops below the load threshold after the second DC power source is electrically connected to the load.

16. The system of claim 10, wherein the first and the second DC power sources comprise fuel cell power generators.

17. The system of claim 10, wherein the controller is configured to turn on the second DC transfer switch to electrically connect the second DC power source to the load and provide power from the second DC power source to the load in response to determining that the output current from the first DC power source is not zero.

18. The method of claim 1, wherein the second DC power source is electrically connected to the load and the second DC power source provides power to the load in response to determining that the output current from the first DC power source is not zero.

* * * * *